US011906409B2

United States Patent
Srinivasan

(10) Patent No.: US 11,906,409 B2
(45) Date of Patent: Feb. 20, 2024

(54) ANALYTE CONCENTRATOR SYSTEM AND METHODS OF USE

(71) Applicant: DIONEX CORPORATION, Sunnyvale, CA (US)

(72) Inventor: Kannan Srinivasan, Tracy, CA (US)

(73) Assignee: Dionex Corporation, Sunnyvale, CA (US)

( * ) Notice: Subject to any disclaimer, the term of this patent is extended or adjusted under 35 U.S.C. 154(b) by 0 days.

(21) Appl. No.: 17/577,262

(22) Filed: Jan. 17, 2022

(65) Prior Publication Data

US 2022/0236153 A1    Jul. 28, 2022

Related U.S. Application Data

(62) Division of application No. 15/043,332, filed on Feb. 12, 2016, now Pat. No. 11,226,274.

(51) Int. Cl.
*G01N 1/40* (2006.01)
*G01N 30/08* (2006.01)
(Continued)

(52) U.S. Cl.
CPC .......... *G01N 1/405* (2013.01); *B01D 15/361* (2013.01); *G01N 30/08* (2013.01); *G01N 30/38* (2013.01);
(Continued)

(58) Field of Classification Search
CPC .. G01N 30/08; G01N 2030/085; G01N 30/96; G01N 2030/965; G01N 1/405; B01D 15/361; B01D 15/362; B01D 15/363
See application file for complete search history.

(56) References Cited

U.S. PATENT DOCUMENTS

| 5,248,426 A | 9/1993 | Stillian et al. |
| 5,352,360 A | 10/1994 | Stillian et al. |

(Continued)

FOREIGN PATENT DOCUMENTS

| EP | 0038720 A1 | 10/1981 |
| EP | 2848933 A2 | 3/2015 |

(Continued)

OTHER PUBLICATIONS

Anonymous: "A Recent Development in Ion Chromatography Detection: The Self-Regenerating Suppressor", International Laboratory, vol. 23, No. 1, Jan. 1993 (Jan. 1993), XP000354918, pp. 1-6, ISSN: 0010-2164.

(Continued)

*Primary Examiner* — Jennifer Wecker
*Assistant Examiner* — Michelle Adams

(57) ABSTRACT

Systems and methods for concentrating an analyte preparatory to analysis thereof include processing the effluent of an analyte concentrator to produce an eluent for eluting an analyte retained in the same or separate concentrator, and systems implementing the same. The analyte concentrator system connects the effluent outlet of an analyte concentrator column to an eluent generation module such that the substantially analyte-free effluent discharged from the analyte concentrator column passes fluidly into the eluent generation module. Eluent generated from the substantially analyte-free effluent in the eluent generation module is likewise substantially free of the analyte. The systems and methods can minimize and/or (substantially) eliminate background signal during analysis of the concentrated analyte.

10 Claims, 9 Drawing Sheets

(51) Int. Cl.
*B01D 15/36* (2006.01)
*G01N 30/96* (2006.01)
*G01N 30/38* (2006.01)
*G01N 30/40* (2006.01)

(52) U.S. Cl.
CPC .............. *G01N 30/40* (2013.01); *G01N 30/96* (2013.01); *G01N 2030/085* (2013.01)

(56) References Cited

U.S. PATENT DOCUMENTS

| | | | |
|---|---|---|---|
| 6,077,434 | A | 6/2000 | Srinivasan et al. |
| 6,225,129 | B1 | 5/2001 | Liu et al. |
| 6,328,885 | B1 | 12/2001 | Srinivasan et al. |
| 6,562,628 | B1 | 5/2003 | Liu et al. |
| 7,682,506 | B2 | 3/2010 | Srinivasan et al. |
| 8,771,517 | B2 | 7/2014 | Srinivasan et al. |
| 11,226,274 | B2 * | 1/2022 | Srinivasan ............. G01N 30/96 |
| 2002/0182741 | A1 | 12/2002 | Liu et al. |
| 2006/0186046 | A1 | 8/2006 | Liu et al. |
| 2006/0219638 | A1 | 10/2006 | Watanabe et al. |
| 2007/0062876 | A1 | 3/2007 | Srinivasan et al. |
| 2008/0236256 | A1 | 10/2008 | Brand et al. |
| 2009/0188799 | A1 | 7/2009 | Anderson, Jr. et al. |
| 2009/0211980 | A1 | 8/2009 | Liu et al. |
| 2010/0139376 | A1 | 6/2010 | Srinivasan et al. |
| 2015/0275380 | A1 | 10/2015 | Liu et al. |

FOREIGN PATENT DOCUMENTS

| | | |
|---|---|---|
| JP | H09511838 A | 11/1997 |
| JP | 2001520752 A | 10/2001 |
| WO | WO-9627793 A1 | 9/1996 |
| WO | WO-9938595 A1 | 8/1999 |

OTHER PUBLICATIONS

Biesaga M., et al., "Coupled Ion Chromatography for the Determination of Chloride, Phosphate and Sulphate in Concentrated Nitric Acid", Journal of Chromatography A, Elsevier, Amsterdam, NL, vol. 1026, No. 1-2, Feb. 13, 2004 (Feb. 13, 2004), XP004482729, pp. 195-200, ISSN: 0021-9673. DOI: 10.1016/J.CHROMA.2003. 11.001.

Bruno, P., et al., "Determination of nutrients in the presence of high chloride concentrations by column-switching ion chromatography," J. Chromatogr. A 1003(1-2):133-141 (Jun. 2003).

Christison et al., "Determination of Trace Anions in Ultrapure Water Using Capillary Ion Chromatography," Technical Note: 112, 11 pages, 2012.

Columbini, S., et al., "Use of column-switching ion chromatography for the simultaneous determination of total nitrogen and phosphorus after microwave assisted persulphate digestion," J. Chromatogr. A 822(1):162-166 (Sep. 1998).

Dionex Corporation: "The Use of Concentrator Columns in Ion Chromatography", Technical Note 8, LPN0576, (1994), pp. 1-8.

Dionex: "Reagent-Free Ion Chromatography Systems with Eluent Regeneration," Dionex Corporation, Sunnyvale, CA, LPN 2022-03 PDF 3/10. (Year: 2010).

Galceran, M., et al., "Column-switching techniques in the analysis of phosphate by ion chromatography," J. Chromatogr. A 675(1-2):141-147 (Jul. 1994).

Huang, Y., et al., "Determination of bromate in drinking water at the low .mu.g/l level by column switching ion chromatography," J. Liq. Chromatogr. Rel. Technol. 22(14):2235-2245 (1999).

Lui et al., "Reagent-free ion chromatography systems with eluent regeneration: RFIC-ER systems", American Laboratory (2007), vol. 39 (3), pp. 17-19, 14.

Peldszus, S., et al., "Quantitative determination of oxalate and other organic acids in drinking water at low .mu.g/l concentrations," J. Chromatogr. A 793(1):198-203 (Jan. 1998).

Rey, M., et al., "Column switching for difficult cation separations," J. Chromatogr. A 789(1-2):149-155 (Nov. 1997).

Umile, C., et al., "Significant reduction of the detection limit in ion chromatography by relative analyte enrichment with column switching," J. Chromatogr. A 723(1):11-17 (Feb. 1996).

Utzman, S., et al., "Fast analysis of pulping liquors using ion chromatography and column switching," LC-GC 9(4):301-302 (Apr. 1991).

Villase nor, S., "Matrix elimination in liquid chromatography using heart-cut column switching techniques," Anal. Chem. 63(14):1362-1366 (Jul. 1991).

EP Extended Examination Report dated Jan. 25, 2023, to EP Patent Application No. 17 155 751.5.

\* cited by examiner

ANALYTE CONCENTRATOR SYSTEM AND METHODS OF USE

CROSS-REFERENCE TO RELATED APPLICATIONS

This application is a divisional under 35 U.S.C. § 121 and claims the priority benefit of co-pending U.S. patent application Ser. No. 15/043,332, filed Feb. 12, 2016. The disclosure of the foregoing application is incorporated herein by reference.

BACKGROUND

1. Technical Field

The present disclosure relates generally to systems and methods for concentrating an analyte preparatory to analysis thereof. In particular, the present disclosure relates to methods for processing the effluent of an analyte concentrator to produce an eluent for eluting the analyte retained in the same or separate concentrator, and to systems implementing the same. The present disclosure further relates to an analyte concentrator system that connects the effluent outlet of an analyte concentrator to an eluent generation module, and to methods implementing the same.

2. Related Technology

In existing analyte concentrator systems (or columns), a fluid sample containing at least one analyte molecule of interest is introduced into an analyte concentrator column that retains at least some of the analyte molecules in the fluid sample. After washing any un-retained fluid sample or constituents thereof from the column, the retained analyte molecules are eluted from the column in a concentrated volume relative to the original fluid sample. For instance, an eluent having a chemical composition adapted for eluting the retained analyte molecules can be introduced into the column to elute the retained analyte. In this way, a fluid sample having a low concentration of analyte molecules can be concentrated for more robust analysis of the analyte.

FIG. 1 is a flowchart diagram illustrating a prior art analyte concentrator system 8 as known to those skilled in the art. As depicted in FIG. 1, an analyte sample 10 is introduced via input line 12 into an analyte concentrator 14. Analyte concentrator 14 is configured to retain one or more analyte molecules of interest contained in analyte sample 10. Accordingly, the analyte is retained in analyte concentrator 14, while the fluid sample effluent is discharged via output line 16 to waste 18.

A wash fluid 20 may also be optionally introduced via input line 22 into analyte concentrator 14. Wash fluid 20 is configured to remove any un-retained sample (e.g., sample fluid or molecular component thereof) from analyte concentrator 14. The wash effluent is also discharged via output line 16 to waste 18.

After washing analyte concentrator 14, an eluent 24 is introduced into analyte concentrator 14. Eluent 24 is chemically configured to elute the analyte retained in analyte concentrator 14. The eluted analyte molecules of interest are then discharged from analyte concentrator 14 (as a concentrated analyte sample) via output line 28 and introduced into analyte detector 30 for analysis.

One drawback to prior art system 8 and other existing concentrator systems is the presence of analyte molecules and/or contaminants in the wash fluid 20 and/or the eluent 24. Indeed, the wash fluid 20 and/or eluent 24 may include the very analyte sought to be analyzed in analyte detector 30. Even wash fluid and/or eluent generated from ultra-pure or nano-filtered water may not be entirely or even substantially free of the analyte molecules of interest. Thus, the amount or concentration of analyte eluted from analyte concentrator 14 may not represent the actual amount of analyte in analyte sample 10. Instead, analyte concentrator 14 may have retained the analyte molecules contained in wash fluid 20. In addition, the eluent itself may include analyte molecules; adding to the amount of analyte molecules present in the eluted analyte sample. Further, the eluent may include ionic contaminants from the water source that interfere with the analyte measurement. These additional sources of analyte molecules in the concentrated analyte sample can adulterate the sample and alter the analytical results.

Subtractive normalization or other techniques may be used to remove analytical (background) noise caused by analyte or ionic contaminants in the eluent and/or wash fluid. However, if the analyte sample only contained trace amounts (e.g., on the order of parts-per-billion (ppb) or even parts-per-trillion (ppt)) of the analyte molecules of interest, the background signal (or noise) from the additional analyte molecules in the eluent and/or wash fluid may overwhelm the analyte signal and negate accurate, quantitative measurement of the concentrated analyte molecules of interest.

Accordingly, it would be beneficial to provide systems and methods for concentrating an analyte using a eluent that is substantially free of the analyte molecule(s) of interest or ionic contaminants (e.g., to minimize and/or (substantially) eliminate background signal during analysis of the concentrated analyte).

BRIEF DESCRIPTION OF THE DRAWINGS

In order to describe the manner in which the above-recited and other advantages and features of the invention can be obtained, or to further clarify the above and other advantages and features of the present disclosure, a more particular description of the disclosure briefly described above will be rendered by reference to specific implementations and/or embodiments thereof which are illustrated in the appended drawings. While the drawings are generally drawn to scale for some example embodiments, it should be understood that the scale may be varied and the illustrated embodiments are not necessarily drawn to scale for all embodiments encompassed herein.

Furthermore, it will be readily appreciated that the components of the illustrative embodiments, as generally described and illustrated in the figures herein, could be arranged and designed in a wide variety of different configurations, and that components within some figures are interchangeable with, or may supplement, features and components illustrated in other figures. Accordingly, understanding that the drawings depict only typical implementations and/or embodiments of the disclosure and are not, therefore, to be considered to be limiting of its scope, the embodiments will be described and explained with additional specificity and detail through the use of the accompanying drawings in which.

DETAILED DESCRIPTION

Figure 1:
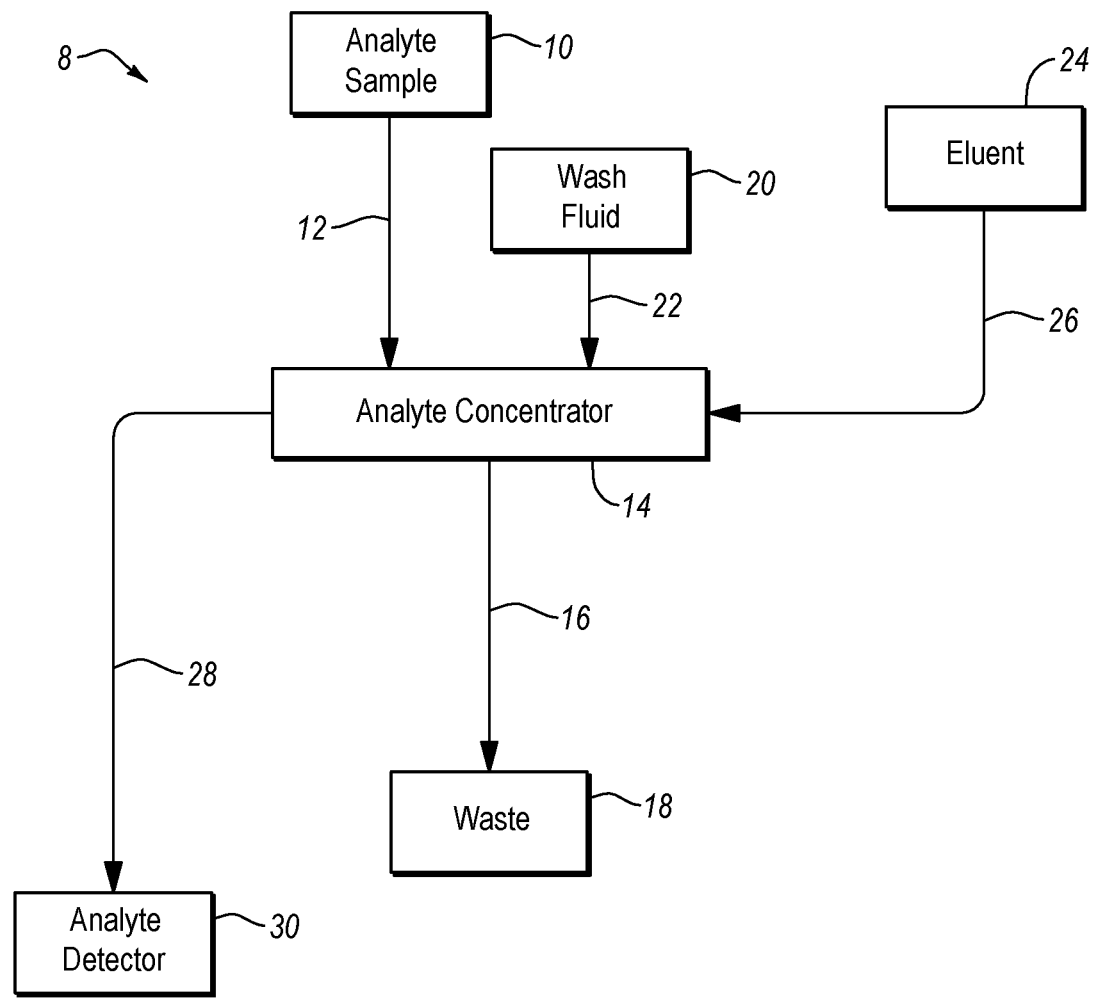
FIG. 1 illustrates a schematic flow diagram of an exemplary prior art system.

Before describing the present disclosure in detail, it is to be understood that this disclosure is not limited to the specific parameters of the particularly exemplified systems, methods, apparatus, assemblies, products, processes, and/or kits, which may, of course, vary. It is also to be understood that much, if not all of the terminology used herein is only for the purpose of describing particular embodiments of the present disclosure, and is not necessarily intended to limit the scope of the disclosure in any particular manner. Thus, while the present disclosure will be described in detail with reference to specific configurations, embodiments, and/or implementations thereof, the descriptions are illustrative only and are not to be construed as limiting the scope of the claimed invention.

Various aspects of the present disclosure, including devices, systems, methods, etc., may be illustrated with reference to one or more exemplary embodiments or implementations. As used herein, the terms "exemplary embodiment" and/or "exemplary implementation" means "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

Furthermore, unless defined otherwise, all technical and scientific terms used herein have the same meaning as commonly understood by one of ordinary skill in the art to which the present disclosure pertains. While a number of methods and materials similar or equivalent to those described herein can be used in the practice of the present disclosure, only certain exemplary materials and methods are described herein.

It will be noted that, as used in this specification and the appended claims, the singular forms "a," "an" and "the" include plural referents unless the content clearly dictates otherwise. Thus, for example, reference to a "column" includes one, two, or more columns. Similarly, reference to a plurality of referents should be interpreted as comprising a single referent and/or a plurality of referents unless the content and/or context clearly dictate otherwise. Thus, reference to "columns" does not necessarily require a plurality of such columns. Instead, it will be appreciated that independent of conjugation; one or more columns are contemplated herein.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct association between two components or, where appropriate, an indirect association with one another through intervening or intermediate components. In contrast, when a component is referred to as being "directly coupled", "directly attached", "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "rear," "left," "right," "up," "down," "upper," "lower," "inner," "outer," "internal," "external," "interior," "exterior," "proximal," "distal," and the like can be used solely to indicate relative directions and/or orientations and may not otherwise be intended to limit the scope of the disclosure, including the specification, invention, and/or claims.

To facilitate understanding, like reference numerals have been used, where possible, to designate like elements common to the figures. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number. In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where two or more values, or a range of values (e.g., less than, greater than, at least, and/or up to a certain value, and/or between two recited values) is disclosed or recited, any specific value or range of values falling within the disclosed values or range of values is likewise disclosed and contemplated herein. Thus, disclosure of an illustrative measurement or distance less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

Various modifications can be made to the illustrated embodiments without departing from the spirit and scope of the invention as defined by the claims. Thus, while various aspects and embodiments have been disclosed herein, other aspects and embodiments are contemplated. It is also noted that systems, methods, apparatus, devices, products, processes, and/or kits, etc., according to certain embodiments of the present disclosure may include, incorporate, or otherwise comprise properties, features, components, members, and/or elements described in other embodiments disclosed and/or described herein. Thus, reference to a specific feature in relation to one embodiment should not be construed as being limited to applications only within said embodiment.

The headings used herein are for organizational purposes only and are not meant to be used to limit the scope of the description or the claims.

In the description, example systems, methods, and/or apparatus may be described with reference to one or more analytes or analyte molecules (of interest). It should be appreciated that as used herein, "analyte" can refer to a substance whose chemical constituent(s) are being analyzed (e.g., detected, isolated, separated, identified, measured, quantified, etc.) and/or the chemical constituent(s) themselves (i.e., a chemical substance that is the subject of chemical analysis, a substance or chemical constituent that is of interest in an analytical procedure, etc.). Thus, an illustrative fluid (e.g., drinking water) sample can be and/or constitute an analyte having or comprising one or more analyte molecules of interest disposed or contained therein. Alternatively or in addition, the one or more analyte molecules of interest disposed or contained in the drinking water sample can likewise constitute analyte(s). Thus, where appropriate, an analyte (i.e., fluid sample) can be introduced into a concentrator column configured to retain the analyte (i.e., molecule(s) of interest) without departing from the scope of this disclosure.

Moreover, as used herein, a "molecule" or "molecule of interest" includes other matter of interest, including but not limited to cells, particles, compounds, crystals, aggregates, etc. For instance, in at least one embodiment, a molecule of interest can comprise phosphate, sulfate, nitrate, nitride, bromate, chlorite, chloroform, bromoform, asbestos, or another molecular compound, including acids, hydrocarbons, and the like. In other embodiments, a molecule of interest can comprise a (charged) elemental molecule, such as fluoride, chloride, bromide, arsenic, barium, chromium, etc., as well as compounds including the same. Thus, reference to a "molecule" or "molecule of interest" should not be construed as being limited to a (single) molecule, per se.

Rather, such terms should be construed broadly to include any substance or matter (e.g., that may be present or included in a liquid sample).

In addition, example systems, methods, and/or apparatus may be described with reference to one or more ions, ionic molecules, ionized molecules, charged molecules, and the like. It will be appreciated that such terms are illustrative and/or representative of analytes, in general, and should be understood accordingly.

It is further to be understood that some of the drawings included herewith, and which are referenced herein, are diagrammatic and schematic representations of example embodiments, and are not limiting of the present disclosure. Moreover, while various drawings are provided at a scale that is considered functional for some embodiments, the drawings are not necessarily drawn to scale for all contemplated embodiments. No inference should therefore be drawn from the drawings as to the necessity of any scale.

Furthermore, as indicated above, in the exemplary embodiments illustrated in the figures, like structures will be provided with similar reference designations, where possible. Specific language will be used herein to describe the exemplary embodiments. Nevertheless it will be understood that no limitation of the scope of the disclosure is thereby intended. It is to be understood that the drawings are diagrammatic and schematic representations of various embodiments of this disclosure, and are not to be construed as limiting the scope of the disclosure, unless such shape, form, scale, function, or other feature is expressly described herein as essential.

Alterations and further modifications of the inventive features illustrated herein, and additional applications of the principles illustrated herein, which would occur to one skilled in the relevant art and having possession of this disclosure, are to be considered within the scope of this disclosure. Unless a feature is described as requiring another feature in combination therewith, any feature herein may be combined with another feature of a same or different embodiment disclosed herein. Furthermore, various well-known aspects of illustrative systems, methods, apparatus, and the like are not described herein in particular detail in order to avoid obscuring aspects of the example embodiments.

Exemplary embodiments of the present disclosure generally relate to systems and methods for concentrating an analyte preparatory for analysis thereof. In particular, the present disclosure relates to methods for processing the effluent of an analyte concentrator to produce an eluent for eluting an analyte retained in the same or separate concentrator, and to systems implementing the same. The present disclosure further relates to an analyte concentrator system that connects the effluent outlet of an analyte concentrator to an eluent generation module, and to methods implementing the same.

Figure 2:
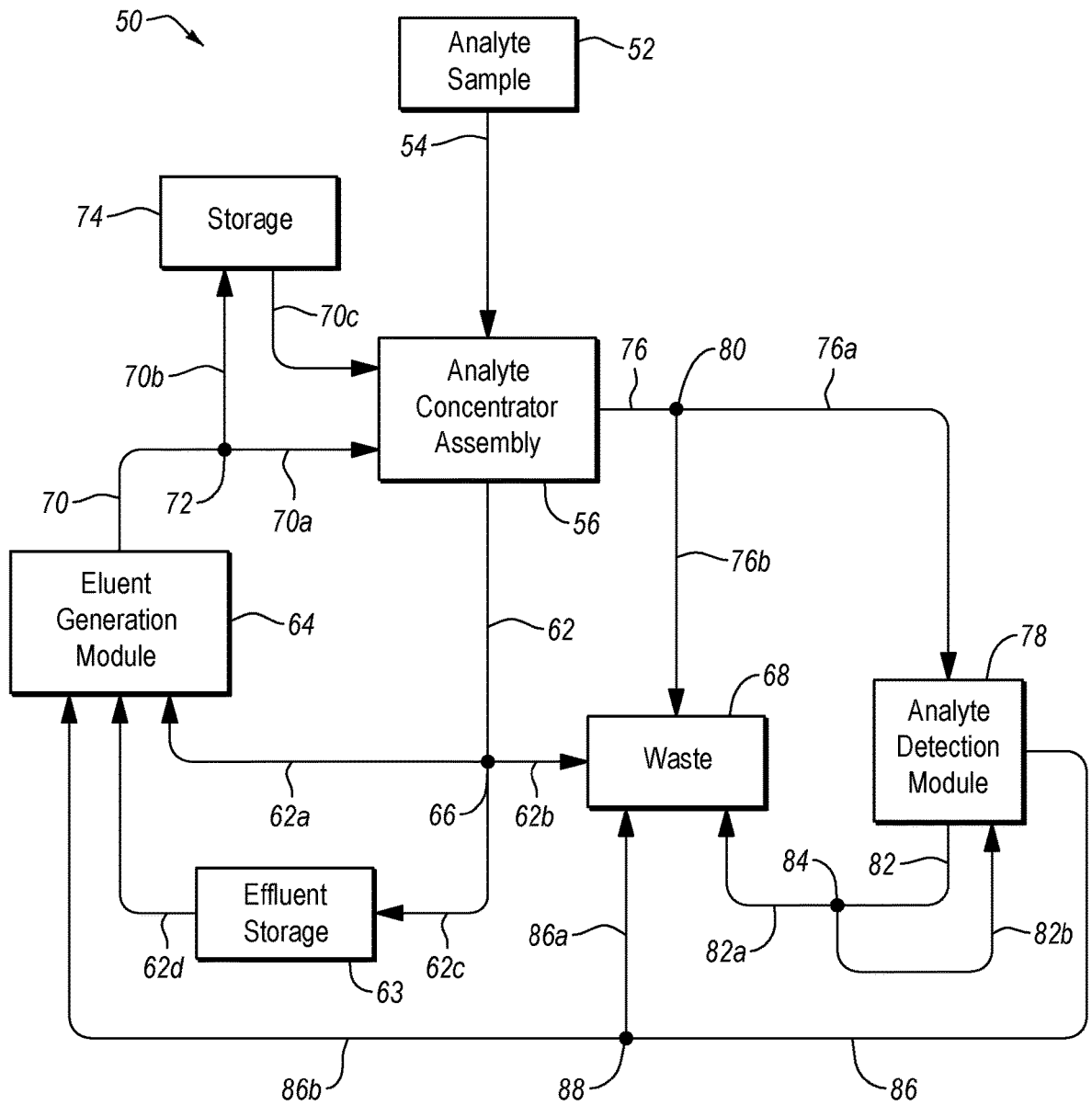
FIG. 2 illustrates a schematic flow diagram of an analyte concentrator system in accordance with an embodiment of the present disclosure.

Reference will now be made to the figures to describe various aspects of example embodiments of the disclosure. FIG. 2 depicts a flow diagram of an analyte concentrator system 50 incorporating some features of the present disclosure. In a first embodiment, analyte concentrator system 50 comprises an analyte concentrator assembly 56 fluid-coupled to an eluent generation module 64 via an (effluent) output line 62. As depicted in FIG. 2, an analyte sample 52 is introduced via (analyte) input line 54 into an analyte concentrator assembly 56. Analyte concentrator assembly 56 is configured to retain one or more analyte molecules of interest contained in analyte sample 52. Accordingly, at least a portion of the analyte molecule(s) is retained in analyte concentrator assembly 56, while the fluid sample effluent (e.g., a substantially analyte-free sample effluent) is discharged from analyte concentrator assembly 56 via output line 62.

Substantially analyte-free fluid sample effluent discharged from analyte concentrator assembly 56 is routed (e.g., fluidly) via output line 62 from analyte concentrator assembly 56 to eluent generation module 64 (e.g., where the substantially analyte-free effluent can be used to generate a substantially analyte-free eluent). Thus, unlike existing systems in which an effluent is discharged into waste (see FIG. 1), embodiments of the present disclosure can use the substantially analyte-free effluent to generate a substantially analyte-free eluent. Accordingly, whereas existing systems rely on a separate fluid source to generate eluent; adding to labor costs, decreasing efficiencies, and resulting in eluent that may contain a substantial amount of the analyte molecule of interest, embodiments of the present disclosure route the effluent discharged from an analyte concentrator assembly specifically designed to retain the analyte molecule of interest (thereby discharging a substantially analyte-free effluent) into an eluent generation module to produce a eluent therefrom that is, likewise, substantially free of the analyte molecule of interest retained in the analyte concentrator assembly.

As used herein, "substantially analyte-free," "substantially free of the analyte (molecule(s))," and the like can be used to refer to a fluid, sample, and/or product having, including, comprising and/or containing less than or equal to a threshold amount of a particular analyte (of interest). For instance, the threshold amount can be measured in terms of molar concentration, mass, etc. In one embodiment, "substantially analyte-free," "substantially free of the analyte (molecule(s))," and the like can refer to less than or equal to nano-molar, pico-molar, femto-molar, atto-molar, etc. Alternatively, "substantially analyte-free," "substantially free of the analyte (molecule(s))," and the like can refer to less than or equal to a value (whole number or decimal value) of nano-grams, pico- grams, femto- grams, atto- grams, etc. per unit of volume (e.g., liter, kiloliter, etc.).

The threshold amount can also be measured in terms of quantity-per-quantity (e.g., parts (analyte) per notation (reference)). Accordingly, this (set of) pseudo unit(s) can be used to describe the small values of the analyte concentration (i.e., substantially free) in dimensionless quantities or terms (e.g., mole fraction, mass fraction, etc.). Specifically, the threshold can be measured in terms of ppm (parts-per-million, $10^{-6}$), ppb (parts-per-billion, $10^{-9}$), ppt (parts-per-trillion, $10^{-12}$) and ppq (parts-per-quadrillion), etc.; where parts can comprise any value (whole number or decimal value). Accordingly, "substantially analyte-free," "substantially free of the analyte (molecule(s))," and the like can refer to less than or equal to one part analyte per billion parts reference. The unit "1 ppb" can be used for a mass fraction if the analyte is present at one-millionth of a gram per gram of sample solution, etc. When working with aqueous solutions, it is common to assume that the density of water is 1.00 g/mL. Therefore, it is common to equate 1 gram of water with 1 mL of water. Consequently, ppb corresponds to 1 µg/L water (or water based fluid, in some instances).

In a further embodiment, eluent generated in eluent generation module 64 (of or from the analyte sample effluent) can similarly be routed (e.g., fluidly) via an (eluent) input line 70 from eluent generation module 64 to analyte concentrator assembly 56, where the eluent can be used to elute an analyte retained in analyte concentrator assembly 56.

In at least one further embodiment, the eluted analyte can be routed (e.g., fluidly) via an (analyte) output line 76 from analyte concentrator assembly 56 to an analyte detection module 78, where the analyte can be analyzed (e.g., the presence of the analyte can be detected, the identity of the analyte can be determined, the quantity and/or quality of the analyte can be measured, etc.). The analyte detection module comprises at least one detector selected from the group consisting of a conductivity detector, electrochemical detector, mass spectrometry detector, ultraviolet detector, and the like. After passing through analyte detection module 78, fluid sample can be discharged via output line 82 to waste 68.

An optional wash fluid can also be introduced into analyte concentrator assembly 56 via a separate wash fluid input line (not shown). Alternatively, the wash fluid can be introduced via input line 54. The wash fluid can comprise a pre-wash (e.g., configured to remove any foreign and/or undesirable matter from analyte concentrator assembly 56 and/or to prepare analyte concentrator assembly 56 to receive analyte sample 52). Alternatively, or in addition, the wash fluid can comprise a post-wash (e.g., configured to remove any unretained sample (e.g., analyte sample fluid or molecular component thereof)) from analyte concentrator assembly 56. A wash fluid effluent can also be discharged from analyte concentrator assembly 56 via output line 62. Alternatively, the wash fluid effluent can be discharged via a separate output line (not shown). Those skilled in the art will appreciate, however, that certain embodiment may not include a wash fluid and/or a washing step as described above. Instead, in some embodiments, the volume of analyte sample 52, for instance, may be sufficient to ensure that a suitable amount of analyte sample 52 passes through analyte concentrator assembly 56, a suitable amount of analyte is retained by analyte concentrator assembly 56, and/or a suitable amount of effluent passes out of analyte concentrator assembly 56, etc.

Output line 62 can optionally include an (effluent) output valve 66 configured to selectively open one of optional lines 62a, 62b, and 62c (and selectively closing the other lines). For instance, output valve 66 can selectively open line 62a, connecting effluent output line 62 to eluent generation module 64, while selectively closing lines 62b and 62c. Alternatively, output valve 66 can selectively open line 62b, connecting output line 62 to a waste (drain) 68, while selectively closing lines 62a and 62c. Furthermore, output valve 66 can selectively open line 62c, connecting output line 62 to an effluent (purified water/mobile phase) storage member 63, while selectively closing lines 62a and 62b. In an illustrative operation, the (substantially analyte-free) sample effluent passing out of analyte concentrator assembly 56 via effluent output line 62 can be selectively routed via line 62a to eluent generation module 64 or via line 62c to storage member 63. Effluent stored in storage member 63 can be routed via line 62d to eluent generation module 64. In some embodiments, effluent stored in storage member 63 can be useful in a variety of other applications, such as making (generating) standards free from analyte ions using the stored effluent as a diluent (which can be either done offline volumetrically or inline via a flowing stream). Similarly, the optional wash fluid effluent (e.g., substantially analyte-free wash fluid effluent) passing out of analyte concentrator assembly 56 (e.g., via effluent output line 62) can be selectively routed via line 62a to eluent generation module 64 or via line 62c to storage member 63 (e.g., to generate additional substantially analyte-free eluent and/or to wash the eluent generation module 64). Alternatively, the wash fluid effluent passing out of analyte concentrator assembly 56 via effluent output line 62 can be selectively routed via line 62*b* to waste 68.

Eluent line 70 can also optionally include a valve 72 (e.g., eluent valve) configured to selectively open one of optional lines 70*a* and 70*b* (and selectively closing the other line). For instance, valve 72 can selectively open line 70*a*, connecting input line 70 to analyte concentrator assembly 56, while selectively closing line 70*b*. Alternatively, output valve 72 can selectively open line 70*b*, connecting eluent line 70 to an optional storage member 74, while selectively closing line 70*a*. In an illustrative operation, the substantially analyte-free eluent can pass out of eluent generation module 64 via eluent line 70 and can be selectively routed via line 70*b* to optional storage 74.

Storage 74 can comprise a receptacle in some embodiments. Accordingly, the substantially analyte-free eluent can be stored in the receptacle for later use. For instance, a line 70*c* connects storage 74 to analyte concentrator assembly 56. Accordingly, substantially analyte-free eluent can pass out of storage 74 and into analyte concentrator assembly 56 to elute the retained analyte. Storage 74 can overcome a potential problem in the configuration of system 50. Specifically, analyte concentrator assembly 56 may not be prepared (e.g., sufficiently washed, etc.) to receive the eluent at the time it is discharged from eluent generation module 64 in some embodiments and/or applications (e.g., during a certain run or assay). Thus, storage 74 can provide a delay sufficient to provide time necessary to (fully) prepare analyte concentrator assembly 56 prior to introducing the eluent therein.

Alternatively, eluent line 70 can be configured to provide a sufficient delay in delivering the eluent to analyte concentrator assembly 56. For instance, eluent line 70 can include a sample loop, as known in the art. The sample loop can be connected (e.g., fluidly) to analyte concentrator assembly 56, can be used to precisely load a known volume of the sample into the concentrator column, and/or can provide the delay described above. Such a delay may be necessary in order to complete the processing of analyte sample 52 (through analyte concentrator assembly 56) and/or may potentially eliminate the need for a separate storage 74 and/or valve 72. Alternatively, the substantially analyte-free eluent can pass out of eluent generation module 64 via eluent line 70 and can be selectively routed via line 70*a* into analyte concentrator assembly 56 to elute the retained analyte.

Output line 76 can also optionally include a valve 80 (e.g., eluted analyte valve) configured to selectively open one of optional lines 76*a* and 76*b* (and selectively closing the other line). For instance, valve 80 can selectively open line 76*a*, connecting output line 76 to analyte detection module 78, while selectively closing line 76*b*. Alternatively, output valve 80 can selectively open line 76*b*, connecting output line 76 to waste 68, while selectively closing line 76*a*. In an illustrative operation, the eluted analyte can pass out of analyte concentrator assembly 56 via output line 76 and can be selectively routed via line 76*a* to analyte detection module 78. On the other hand, a wash fluid flowing through system 50 can pass out of analyte concentrator assembly 56 via output line 76 and can be selectively routed via line 76*b* to waste 68.

Output line 82 can also optionally include an output valve 84 configured to selectively open one of optional lines 82*a* and 82*b* (and selectively closing the other line). For instance, valve 84 can selectively open line 82*a*, connecting output line 82 to waste 68, while selectively closing line 82*b*. Alternatively, output valve 84 can selectively open line 82*b*, connecting output line 82 to analyte detection module 78, while selectively closing line 82*a*. In an illustrative operation, fluid sample can be recirculated back into at least a portion of analyte detection module 78 through a line 82*b* (to regenerate one or more components thereof).

Recirculated sample can be discharged from analyte detection module 78 via an output line 86. Output line 86 can also optionally include an output valve 88 configured to selectively open one of optional lines 86*a* and 86*b* (and selectively closing the other line). For instance, valve 88 can selectively open line 86*a*, connecting output line 86 to waste 68, while selectively closing line 86*b*. Alternatively, output valve 88 can selectively open line 86*b*, connecting output line 86 to elution generation module 64, while selectively closing line 86*a*. In an illustrative operation, fluid sample can be recirculated back into at least a portion of elution generation module 64 (to regenerate one or more components thereof).

Those skilled in the art will appreciate that different embodiments of system 50 can comprise different combinations of the components described above and/or illustrated in FIG. 2. Accordingly, system 50 according to one or more specific embodiments need not include each and every component described above and/or illustrated in FIG. 2. Similarly, a variety of methods described herein can involve passing one or more fluid samples through system 50 or one or more components thereof. Accordingly, such methods (or other methods) need not include each and every step described above and/or illustrated in FIG. 2.

Furthermore, various components of system 50 and/or methods involving the same (or other methods) will be discussed in further detail below. It will likewise be appreciated that such components and/or method steps are illustrative only and that various embodiments can include more than or fewer than the described and/or illustrated components and/or method steps.

Figure 3:
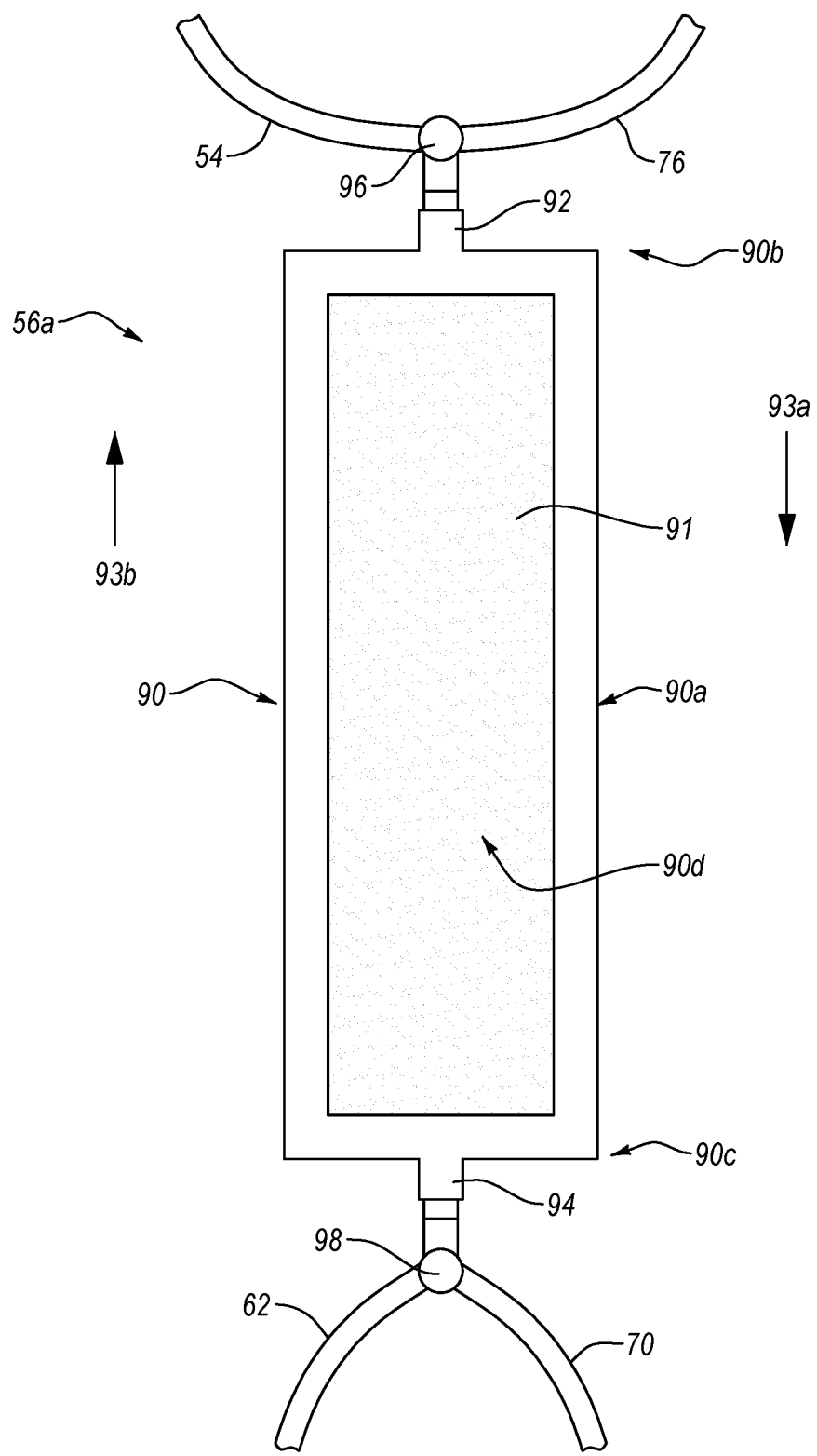
FIG. 3 illustrates a schematic diagram of an analyte concentrator assembly useful in the analyte concentrator system of FIG. 2 in accordance with an embodiment of the present disclosure.

FIG. 3 depicts a more specific illustrative analyte concentrator assembly 56*a* useful in an illustrative system 50 (e.g., which can be used as analyte concentrator assembly 56—see e.g., FIG. 2). As depicted in FIG. 3, analyte concentrator assembly 56*a* comprises an analyte concentrator 90 having an inlet opening 92 and an outlet opening 94. Alternatively, analyte concentrator 90 can have a plurality of inlet openings 92 and/or a plurality of outlet openings 94. Analyte concentrator assembly 56*a* further comprises an optional inlet valve 96, selectively coupling inlet opening 92 of analyte concentrator 90 to (analyte sample) input line 54 and/or (eluted analyte sample) output line 76 (as similarly illustrated in FIG. 2). In addition, analyte concentrator assembly 56*a* comprises an optional outlet valve 98, selectively coupling outlet opening 94 of analyte concentrator 90 to (effluent) output line 62 and/or (eluent) input line 70 (as similarly illustrated in FIG. 2). Accordingly, analyte concentrator may only require a single inlet opening 92 and/or a single outlet opening 94 in certain embodiments.

In some embodiments, analyte concentrator 90 can comprise a concentrator column (e.g., as known in the art). Such concentrator columns can have and/or comprise an encircling side wall 90*a* extending from a first end 90*b* of the concentrator column 90 to an opposing second end 90*c* of the concentrator column 90 and at least partially bounding an internal cavity Such concentrator columns 90 can also have and/or comprise inlet opening 92 disposed at the first end 90*b* and in fluid communication with the internal cavity 90*d* and outlet opening 94 disposed at the second end 90*c* and in fluid communication with the internal cavity 90*d*.

Regardless of specific components and/or configurations, analyte concentrator assembly 56a can have and/or include at least one analyte retention mechanism 91. For instance, analyte concentrator column 90 can, illustratively, be and/or comprise an ion exchange-type concentrator column. Such ion-exchange concentrator columns 90 can have and/or include an analyte retention mechanism 91 disposed within internal cavity 90d. In at least one embodiment, analyte retention mechanism 91 can comprise ion-exchange chromatography material (e.g., resin, polymeric substrate, agarose, beads, and/or other suitable chromatography material). A typical ion-exchange concentrator column 90 is packed with the chromatography material such that the material is disposed and/or retained therein (e.g., in the internal cavity 90d thereof). Such material can be configured to carry a net charge (e.g., in one or more (specific) pH solutions). Electrostatic interactions between the net charged chromatography material and charged analyte molecules can cause the chromatography material to retain (e.g., bind to) the analyte molecules. Salt and/or acid concentration in solution can be used to manipulate the chromatography material into binding or releasing certain types of molecules of interest.

Thus, ion exchange-type concentrator columns 90 can be configured to retain one or more molecular component(s) based on one or more ionic and/or charge-related characteristics thereof (e.g., ionic state in a particular pH of solution). Specifically, some (anionic) concentrator columns 90 can be configured to retain certain negatively-charged (anionic) molecules with positively-charged chromatography material. Accordingly, one or more anionic analytes disposed in a fluid sample may be retained in the column, while the fluid sample effluent is discharged from the column. Alternatively, some (cationic) concentrator columns can be configured to retain certain positively-charged (cationic) molecules with negatively-charged chromatography material. Accordingly, one or more cationic analytes disposed in a fluid sample may be retained in the column 90, while the fluid sample effluent is discharged from the column. Other types of concentrator columns 90 are also known in the art and contemplated herein.

Indeed, a wide variety of analyte concentrator assemblies 56a and/or analyte concentrators 90 can be configured to retain one or more molecular component(s) based on specific chemical and/or structural properties. Each can include an analyte retention mechanism(s) 91 specifically configured to retain one or more analyte molecules of interest while allowing the sample effluent to be discharged. Accordingly, a variety of analyte retention mechanisms 91 are known in the art and contemplated herein.

Those skilled in the art will appreciate that analyte concentrator 90, as depicted in FIG. 3, can also be preferably configured for counter-current elution. Specifically, (eluent) input line 70 is (selectively, fluidly) connected to analyte concentrator 90 via outlet opening 94 (similar and/or adjacent to (effluent) output line 62), and (eluted analyte sample) output line 76 is (selectively, fluidly) connected to analyte concentrator 90 via inlet opening 92. Accordingly, as discussed in further detail below, an analyte sample 52 (see e.g., FIG. 2) may be introduced into and flow through analyte concentrator 90 in a first fluid direction 93a (e.g., from inlet opening 92 toward outlet opening 94), while an eluted concentrated analyte sample may be eluted and discharged from analyte concentrator 90 in a second fluid direction 93b (e.g., from outlet opening 94 toward inlet opening 92). Alternative embodiments can be configured for uniform current flow operation without departing from the scope of this disclosure.

In at least one embodiment, the volume of eluent introduced into analyte concentrator 90 (via port 94 and/or to elute an analyte retained therein) can be substantially less that the volume of the original analyte sample 52 introduced into analyte concentrator assembly 56a and/or analyte concentrator 90 thereof (via inlet 92) during a specific run or assay. Accordingly, the eluted analyte sample can be significantly concentrated relative to the original analyte sample. For instance, the eluted analyte sample can be at least, up to, greater than, about, or between 2-fold, 5-fold, 10-fold, 20-fold, 50-fold, 100-fold, 200-fold, 500-fold, 1000-fold, 10,000-fold, 100,000-fold, or more concentrated relative to the original analyte sample. In some embodiments, for example, analyte concentrator 90 (or the analyte retention mechanism 91 thereof) can initially retain analyte molecules adjacent to inlet opening 92. Accordingly, the retained analytes can elute from analyte concentrator 90 in an eluent volume significantly less than the total volume of the original analyte sample. Thus, the eluted analyte sample can be or comprise a concentrated, eluted analyte sample in some embodiments.

In one or more embodiments, an analyte concentrator assembly can also include one or more multi-port (master) fluid valves. Such a fluid valve can coordinate fluid flow through the system 50 (see e.g., FIG. 2) and/or a concentrator column thereof. In some embodiments, for instance, a multi-port (master) fluid valve can coordinate fluid flow in and out of an concentrator column (such as concentrator column 90 illustrated in FIG. 3) and/or illuminate the need for more or more of optional valves 66, 72, 80, 84, and 88.

Figure 4A:
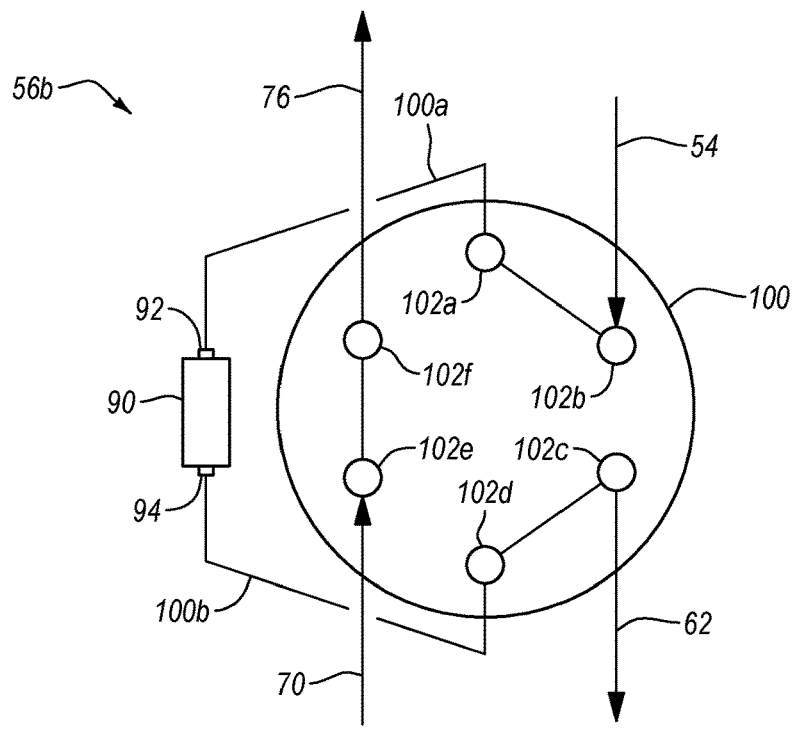
FIGS. 4A and 4B illustrate, respectively, schematic diagrams of an analyte concentrator assembly in a first (4A) and second (4B) configuration in accordance with an embodiment of the present disclosure.
Figure 4B:
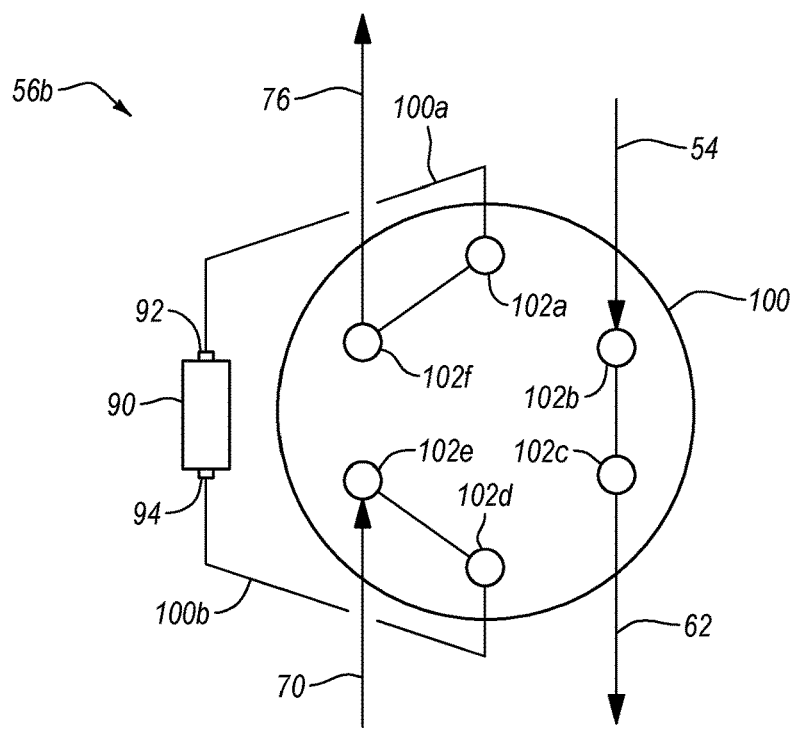

FIGS. 4A and 4B illustrate, schematically, an analyte concentrator assembly 56b comprising a concentrator column 90 and an illustrative multi-port (master) fluid valve 100 in a first valve configuration (FIG. 4A) and a second valve configuration (FIG. 4B). Fluid valve 100 can also be useful in other embodiments of the present disclosure. As illustrated in FIGS. 4A and 4B, fluid valve 100 comprises six selectively connectable ports 102 and is selectively configurable between the first and second valve configurations (to selectively connect different combinations of the plurality of ports). Fluid valves having less than six or greater than six ports are also contemplated herein.

In both the first and second valve configurations (illustrated in FIGS. 4A and 4B, respectively), inlet opening 92 of analyte concentrator 90 is fluid coupled with a concentrator inlet port 102a. Similarly, outlet opening 94 of analyte concentrator 90 is fluid coupled with a concentrator outlet port 102d. As discussed in further detail below, selective fluid communication between concentrator inlet port 102a and adjacent ports 102b and 102f alternates between the first and second valve configurations, respectively. Accordingly, inlet opening 92 is selectively fluid connectable with port 102b and with port 102f. Likewise, selective fluid communication between concentrator outlet port 102d and adjacent ports 102c and 102e alternates between the first and second valve configurations, respectively. Accordingly, outlet opening 94 is selectively fluid connectable with port 102c and with port 102e.

As depicted in FIG. 4A, in the first valve configuration, analyte input line 54 is connected to a first fluid inlet port 102b, which is in fluid communication with concentrator inlet port 102a through the first fluid path of fluid valve 100 (in the first valve configuration). Accordingly, because inlet opening 92 of analyte concentrator 90 is in fluid communication with concentrator inlet port 102a, analyte input line 54 is in fluid communication with analyte concentrator 90 in the first valve configuration.

Likewise, in the first valve configuration, effluent output line 62 is connected to a first fluid outlet port 102*c*, which is in fluid communication with concentrator outlet port 102*d* through the first fluid path of fluid valve 100 (in the first valve configuration). Accordingly, because outlet opening 94 of analyte concentrator 90 is in fluid communication with concentrator outlet port 102*d*, effluent output line 62 is in fluid communication with analyte concentrator 90 in the first valve configuration.

In operation, in the first valve configuration, an analyte sample 52 (see e.g., FIG. 2) passing through analyte input line 54 is introduced into fluid valve 100 at first fluid inlet port 102*b* and passes (fluidly) within the first internal fluid valve flow path of fluid valve 100 to concentrator inlet port 102*a*, and then exits fluid valve 100 through concentrator inlet port 102*a* to pass (fluidly), via an optional valve line 100*a*, into analyte concentrator 90 via inlet opening 92. As described above, analyte molecules disposed in the analyte sample (52) are retained in analyte concentrator 90 by means of one or more analyte retention mechanisms (91). The substantially analyte-free sample effluent (i.e., un-retained fluid sample and/or flow-through) passes (fluidly) out of analyte concentrator 90 via outlet opening 94. The effluent is then introduced into fluid valve 100 at concentrator outlet port 102*d* via an optional valve line 100*b*. The effluent then passes (fluidly) within the first internal fluid valve flow path of fluid valve 100 to first fluid outlet port 102*c*, and then exits fluid valve 100 through fluid outlet port 102*c* to pass (fluidly) through effluent output line 62 (e.g., to eluent generation module 64 as depicted in FIG. 2).

In the first valve configuration, the first internal fluid flow path also includes a fluid connection between second fluid inlet port 102*e* and second fluid outlet port 102*f*. Accordingly, a fluid passing through eluent line 70 is introduced into fluid valve 100 at second fluid inlet port 102*e*. The fluid then passes (fluidly) within the first internal fluid flow path of fluid valve 100 to second fluid outlet port 102*f*, and then exits fluid valve 100 through second fluid outlet port 102*f* to pass (fluidly) through output line 76 (e.g., to waste 68 or analyte detection module 78 as depicted in FIG. 2). Accordingly, fluid delivered to fluid valve 100 via port 102*e* (in the first valve configuration) bypasses analyte concentrator 90 and passes directly to output line 76.

However, as illustrated in FIG. 4B, in the second valve configuration, (substantially analyte-free eluent) fluid passing through eluent line 70 (or a sub-line thereof), is introduced into fluid valve 100 via second fluid inlet port 102*e*, which is in fluid communication with opening 94 of analyte concentrator 90 via port 102*d* and valve line 100*b*. Accordingly, the substantially analyte-free eluent exits fluid valve 100 via port 102*d* and is introduced into analyte concentrator 90 via valve line 100*b* (in a direction opposite the flow of the analyte sample 52 into analyte concentrator 90 (i.e., in a counter-current direction)). As indicated above, the substantially analyte-free eluent can be chemically configured to elute the analyte molecules retained in analyte concentrator 90 (or by the analyte retention mechanism 91 thereof).

The (concentrated) eluted analyte sample exits analyte concentrator 90 via opening 92 and is introduced into fluid valve 100 at port 102*a* by means of valve line 100*a*. The concentrated, eluted analyte sample then passes to second fluid outlet port 102*f* via the second internal fluid flow path of fluid valve 100 (in the second valve configuration), and then exits fluid valve 100 through second fluid outlet port 102*f* to pass (fluidly) through output line 76 (e.g., to analyte detection module 78 as depicted in FIG. 2).

Furthermore, in the second valve configuration, fluid passing through line 54 enters fluid valve 100 via first fluid inlet port 102*b* and passes directly out of fluid valve 100 via the second internal fluid valve flow path and first fluid outlet port 102*c*, and line 62 fluid-coupled therewith.

Figure 5A:
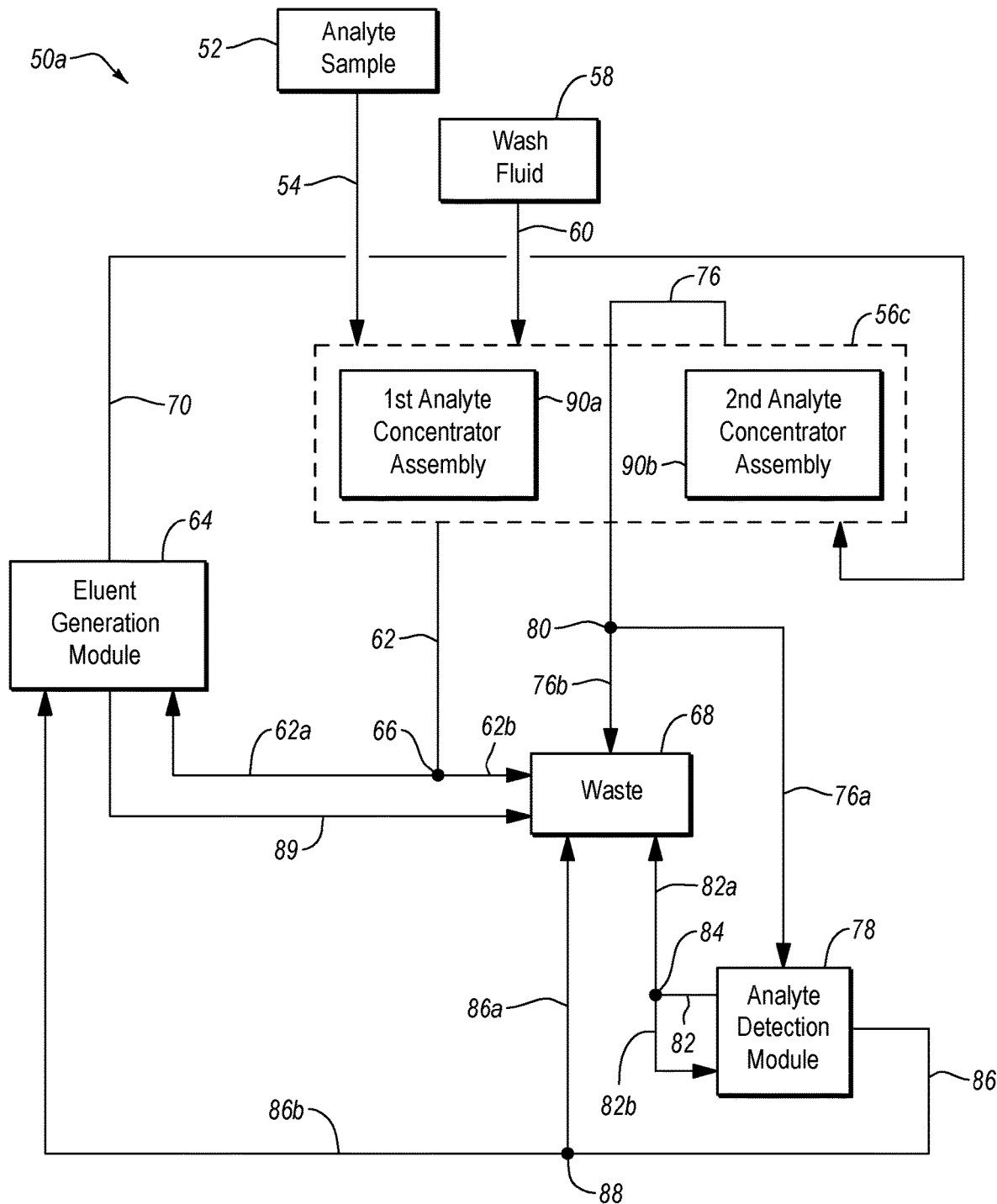
FIGS. 5A and 5B illustrate, respectively, schematic diagrams of an analyte concentrator system in a first (5A) and second (5B) configuration in accordance with another embodiment of the present disclosure.
Figure 5B:
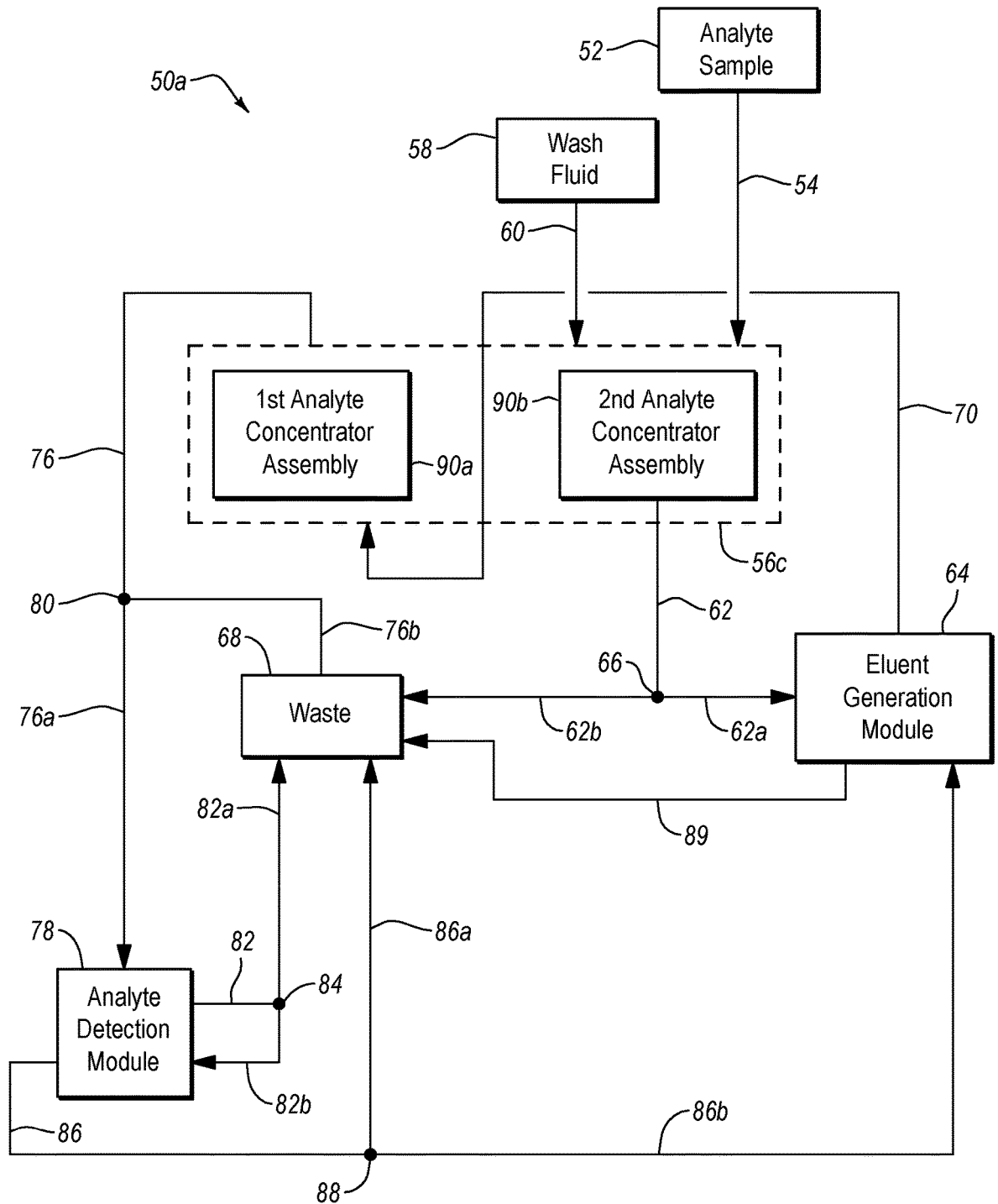

FIGS. 5A and 5B depict, respectively, flow diagrams of an analyte concentrator system 50*a* in a first system configuration (FIG. 5A) and a second system configuration (FIG. 5B). Like elements between analyte concentrator system 50*a* and analyte concentrator system 50 are identified with like reference numerals. Analyte concentrator system 50*a* can be configured substantially similar to analyte concentrator system 50 (see e.g., FIG. 2), with one or more of the following (or other) described and/or depicted differences. In particular, analyte concentrator system 50*a* can include an analyte concentrator assembly 56*c* comprising a first concentrator column 90*a* and a second concentrator column 90*b*.

As depicted in FIG. 5A, in a first system configuration, analyte sample 52 is introduced via (analyte) input line 54 into concentrator column 90*a* of analyte concentrator assembly 56*c*. At least a portion of one or more analyte molecule(s) of interest contained and/or disposed in analyte sample 52 is retained in concentrator column 90*a*, while an analyte sample effluent is discharged therefrom. The fluid sample effluent discharged from concentrator column 90*a* is routed (e.g., fluidly) via output line 62 from analyte concentrator assembly 56*c* and/or concentrator column 90*a* thereof, to eluent generation module 64 (e.g., where the substantially analyte-free effluent can be used to generate a substantially analyte-free eluent). Eluent generated in eluent generation module 64 (of or from the analyte sample effluent) can similarly be routed (e.g., fluidly) via an (eluent) input line 70 from eluent generation module 64 to analyte concentrator assembly 56*c* and/or concentrator column 90*b* thereof, where the eluent can be used to elute an analyte retained in concentrator column 90*b* (as described in further detail below in relation to FIG. 5B).

The analyte eluted from concentrator column 90*b* is routed (e.g., fluidly) via (analyte) output line 76 from analyte concentrator assembly 56*c* and/or concentrator column thereof, to an analyte detection module 78, where the analyte can be analyzed. After passing through analyte detection module 78, fluid sample can be discharged via output line 82.

As indicated above, a wash fluid can also be (optionally) introduced into analyte concentrator assembly 56*c* and/or concentrator column 90*a* thereof via a separate wash fluid input line (not shown). Alternatively, the wash fluid can be introduced via input line 54. The wash fluid effluent can also be discharged from analyte concentrator assembly 56*c* and/or concentrator column 90*a* thereof via output line 62. Alternatively, the wash fluid effluent can be discharged via a separate wash fluid output line (not shown).

One or more of the valves described previously can also be incorporated into system as depicted in FIGS. 5A and 5B, to alter the flow of fluid sample through system 50*a*. Recirculation of analyzed fluid sample can similarly occur as previously described. In at least one embodiment, a waste line 89 can carry recirculated or other fluid from eluent generation module 64 to waste 68. In addition, no fluid sample storage element (such as storage 74 depicted in FIG. 2) is required to operate system 50*a* effectively in one or more embodiments. Specifically, no delay is necessarily required because the eluent generated from the effluent of concentrator column 90*a* is introduced into concentrator column 90*b* to eluent an analyte already disposed and/or retained therein. Said analyte is retained in concentrator column 90*b* as follows.

As depicted in FIG. 5B, in a second system configuration, analyte sample 52 is introduced via (analyte) input line 54 into concentrator column 90*b* of analyte concentrator assembly 56*c*. At least a portion of one or more analyte molecule(s) of interest contained and/or disposed in analyte sample 52 is retained in concentrator column 90*b*, while an analyte sample effluent is discharged therefrom. The fluid sample effluent discharged from concentrator column 90*b* is routed (e.g., fluidly) via output line 62 from analyte concentrator assembly 56*c* and/or concentrator column 90*b* thereof, to eluent generation module 64 (e.g., where the substantially analyte-free effluent can be used to generate a substantially analyte-free eluent). Eluent generated in eluent generation module 64 (of or from the analyte sample effluent) can similarly be routed (e.g., fluidly) via an (eluent) input line 70 from eluent generation module 64 to analyte concentrator assembly 56*c* and/or concentrator column 90*a* thereof, where the eluent can be used to elute an analyte retained in concentrator column 90*a* (as described above in relation to FIG. 5A).

The analyte eluted from concentrator column 90*a* is routed (e.g., fluidly) via (analyte) output line 76 from analyte concentrator assembly 56*c* and/or concentrator column thereof, to analyte detection module 78, where the analyte can be analyzed. After passing through analyte detection module 78, fluid sample can be discharged via output line 82.

As indicated above, no delay is necessarily required in operating system 50*a* because the eluent generated from the effluent of concentrator column 90*b* is introduced into concentrator column 90*a* to eluent an analyte already disposed and/or retained therein.

Those skilled in the art will again appreciate that different embodiments of system can comprise different combinations of the components described above and/or illustrated in FIGS. 5A and 5B. Accordingly, system 50*a* according to one or more specific embodiments need not include each and every component described above and/or illustrated in FIGS. 5A and 5B. Similarly, the method described above in relation to system 50*a* can involve passing one or more fluid samples through one or more components thereof. Accordingly, such method (or other method) need not include each and every step described above and/or illustrated in FIGS. 5A and 5B.

Figure 6A:
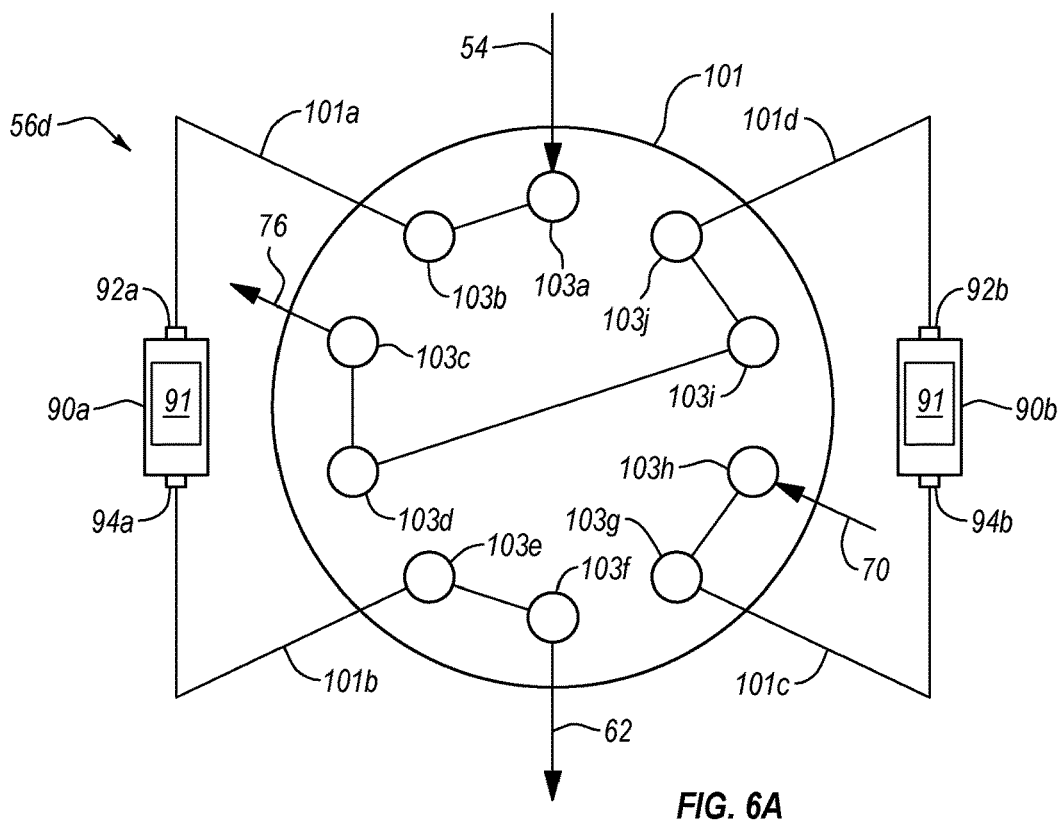
FIGS. 6A and 6B illustrate, respectively, schematic diagrams of an analyte concentrator assembly in a first (6A) and second (6B) configuration in accordance with another embodiment of the present disclosure.
Figure 6B:
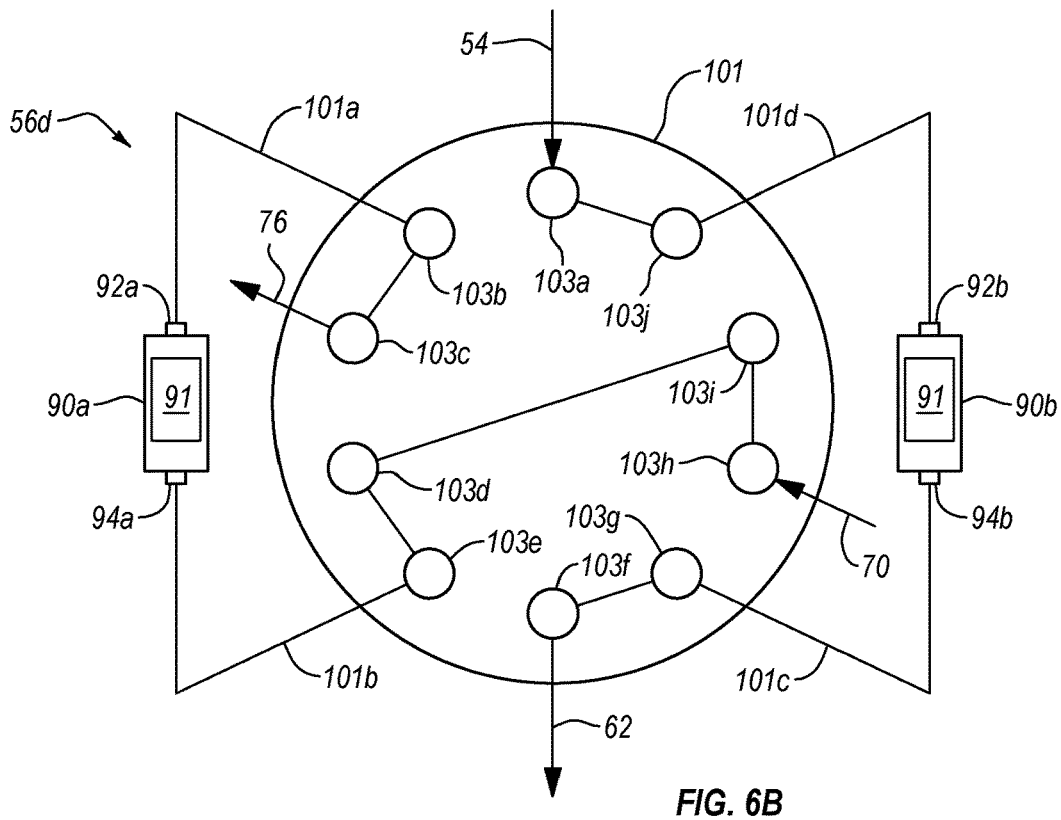

As indicated above, an analyte concentrator assembly can also include one or more multi-port (master) fluid valves. FIGS. 6A and 6B illustrate, schematically, an analyte concentrator assembly 56*d* comprising a first concentrator column 90*a*, a second concentrator column 90*b*, and an illustrative multi-port (master) fluid valve 101 in a first valve configuration (FIG. 6A) and a second valve configuration (FIG. 6B). Fluid valve 100 can also be useful in other embodiments of the present disclosure. As illustrated in FIGS. 6A and 6B, fluid valve 101 comprises ten selectively connectable ports 103 and is selectively configurable between the first and second valve configurations (to selectively connect different combinations of the plurality of ports). Fluid valves having less than ten or greater than ten ports are also contemplated herein.

In both the first and second valve configurations (illustrated in FIGS. 6A and 6B, respectively), inlet opening 92*a* of first analyte concentrator 90*a* is fluid coupled with a first concentrator inlet port 103*b*. Similarly, outlet opening 94*a* of first analyte concentrator 90*a* is fluid coupled with a first concentrator outlet port 103*e*. Likewise, inlet opening 92*b* of second analyte concentrator 90*b* is fluid coupled with a second concentrator inlet port 103*j* and outlet opening 94*b* of second analyte concentrator 90*b* is fluid coupled with a second concentrator outlet port 103*g*.

As discussed in further detail below, selective fluid communication between first concentrator inlet port 103*b* and adjacent ports 103*a* and 103*c* alternates between the first and second valve configurations, respectively. Accordingly, inlet opening 92*a* of first analyte concentrator 90*a* is selectively fluid connectable with port 103*a* and with port 103*c*. Likewise, selective fluid communication between first concentrator outlet port 103*e* and adjacent ports 103*f* and 103*d* alternates between the first and second valve configurations, respectively. Accordingly, outlet opening 94*a* is selectively fluid connectable with port 103*f* and with port 103*d*.

Furthermore, selective fluid communication between second concentrator inlet port 103*j* and adjacent ports 103*i* and 103*a* alternates between the first and second valve configurations, respectively. Accordingly, inlet opening 92*b* of second analyte concentrator is selectively fluid connectable with port 103*i* and with port 103*a*. Likewise, selective fluid communication between second concentrator outlet port 103*g* and adjacent ports 103*h* and 103*f* alternates between the first and second valve configurations, respectively. Accordingly, outlet opening 94*b* is selectively fluid connectable with port 103*h* and with port 103*f*.

As depicted in FIG. 6A, in the first valve configuration, analyte input line 54 is connected to a first fluid inlet port 103*a*, which is in fluid communication with first concentrator inlet port 103*b* through the first internal fluid path of fluid valve 101 (in the first valve configuration). Accordingly, because inlet opening 92*a* of first analyte concentrator 90*a* is in fluid communication with concentrator inlet port 103*b*, analyte input line 54 is in fluid communication with first analyte concentrator 90*a* in the first valve configuration.

Likewise, in the first valve configuration, effluent output line 62 is connected to first fluid outlet port 103*f*, which is in fluid communication with first concentrator outlet port 103*e* through the first internal fluid path of fluid valve 101 (in the first valve configuration). Accordingly, because outlet opening 94*a* of first analyte concentrator 90*a* is in fluid communication with concentrator outlet port 103*e*, effluent output line 62 is in fluid communication with first analyte concentrator 90*a* in the first valve configuration.

Furthermore, in the first valve configuration, (eluent) input line 70 is connected to a second fluid inlet port 103*h*, which is in fluid communication with second concentrator outlet port 103*g* through the first internal fluid path of fluid valve 101 (in the first valve configuration). Accordingly, because outlet opening 94*b* of second analyte concentrator 90*b* is in fluid communication with second concentrator outlet port 103*g*, (eluent) input line 70 is in fluid communication with second analyte concentrator 90*b* in the first valve configuration.

Likewise, in the first valve configuration, (eluted analyte sample) output line 76 is connected to second fluid outlet port 103*c*, which is in fluid communication with connector ports 103*d*, 103*i* through the first internal fluid path of fluid valve 101 (in the first valve configuration). Connector ports 103*d*, 103*i* are, in turn, in fluid communication with second concentrator inlet port 103*j* through the first internal fluid path of fluid valve 101 (in the first valve configuration). Accordingly, because inlet opening 92*b* of second analyte concentrator 90*b* is in fluid communication with concentrator inlet port 103*j*, output line 76 is in fluid communication with second analyte concentrator 90*b* in the first valve configuration.

In operation in the first valve configuration, an analyte sample (52) passing through analyte input line 54 is introduced into fluid valve 101 at first fluid inlet port 103*a*, passes (fluidly) within the first internal fluid valve flow path of fluid valve 101 to first concentrator inlet port 103*b*, and then exits fluid valve 101 through first concentrator inlet port 103*b* to pass (fluidly), via an optional valve line 101*a*, into analyte concentrator 90*a* via inlet opening 92*a*. As described above, analyte molecules disposed in the analyte sample (52) are retained in analyte concentrator 90*a* by means of one or more analyte retention mechanisms (91). The substantially analyte-free sample effluent (i.e., un-retained fluid sample and/or flow-through) passes (fluidly) out of first analyte concentrator 90*a* via outlet opening 94*a*. The effluent is then introduced into fluid valve 101 at first concentrator outlet port 103*e* by means of an optional valve line 101*b*. The effluent then passes (fluidly) within the first internal fluid valve flow path of fluid valve 101 to first fluid outlet port 103*f*, and then exits fluid valve 101 through fluid outlet port 103*f* to pass (fluidly) through effluent output line 62 (e.g., to eluent generation module 64 as depicted in FIG. 2). Those skilled in the art will appreciate that an optional wash fluid can also be introduced through input line 54.

Continuing in the first valve configuration, a fluid eluent (e.g., a substantially analyte-free eluent generated of and/or from the substantially analyte-free effluent of and/or from first concentrator column 90*a* in an eluent generation module) passing through eluent line is introduced into fluid valve 101 at second fluid inlet port 103*h*. The eluent then passes (fluidly) within the first internal fluid flow path of fluid valve 101 (in the first valve configuration) to second fluid outlet port 103*g*, and then exits fluid valve 101 through second fluid outlet port 103*g* and passes (fluidly) through an optional valve line 101*c* to opening 94*b* of concentrator column 90*b*. The eluent elutes at least a portion of the one or more analyte molecules of interest retained therein (as described below in relation to FIG. 6B), which is discharged from column 90*b* through opening 92*b*. The eluted analyte is introduced into fluid valve 101 at port 103*j*. The first internal fluid flow path of fluid valve 101 also includes a fluid connection between ports 103*j*, 103*i*, 103*d*, and 103*c*. Accordingly, the eluted analyte sample introduced into fluid valve 101 via port 103*j* (in the first valve configuration) passes directly to port 103*c* and out of fluid valve 101 via output line 76.

However, as illustrated in FIG. 6B, in the second valve configuration, the analyte sample (52) passing through analyte input line 54 and introduced into fluid valve 101 at first fluid inlet port 103*a*, passes (fluidly) within the second internal fluid valve flow path of fluid valve 101 to second concentrator inlet port 103*j*, and then exits fluid valve 101 through second concentrator inlet port 103*j* to pass (fluidly), via optional valve line 101*d*, into analyte concentrator 90*b* via inlet opening 92*b*. As described above, analyte molecules disposed in the analyte sample (52) are retained in analyte concentrator 90*b* by means of one or more analyte retention mechanisms (91). The substantially analyte-free sample effluent (i.e., un-retained fluid sample and/or flow-through) passes (fluidly) out of second analyte concentrator 90*b* via outlet opening 94*b*. The effluent is then introduced into fluid valve 101 at second concentrator outlet port 103*g* by means of an optional valve line 101*c*. The effluent then passes (fluidly) within the second internal fluid valve flow path of fluid valve 101 (in the second valve configuration) to first fluid outlet port 103*f*, and then exits fluid valve 101 through fluid outlet port 103*f* to pass (fluidly) through effluent output line 62 (e.g., to eluent generation module 64 as depicted in FIG. 2).

Continuing in the second valve configuration, a fluid eluent (e.g., substantially analyte-free eluent generated of and/or from the substantially analyte-free effluent of and/or from second concentrator column 90*b* in an eluent generation module) passing through eluent line 70 is introduced into fluid valve 101 at second fluid inlet port 103*h*, which is in fluid communication with opening 94*a* of first analyte concentrator 90*a* via ports 103*i*, 103*d*, and 103*e*, as well as optional valve line 101*b*. Accordingly, the substantially analyte-free eluent exits fluid valve 101 via port 103*e* and is introduced into analyte concentrator 90*a* (in a direction opposite the flow of the analyte sample (52) into analyte concentrator 90*a* (i.e., in a counter-current direction) as described above in relation to FIG. 6A). The substantially analyte-free eluent can be chemically configured to elute the analyte molecules retained in analyte concentrator 90*a* (or by the analyte retention mechanism (91) thereof).

The (concentrated) eluted analyte sample exits analyte concentrator 90*a* via opening 92*a* and is introduced into fluid valve 101 at port 103*b*. The concentrated, eluted analyte sample then passes to second fluid outlet port 103*c* via the second internal fluid flow path of fluid valve 101 (in the second valve configuration), and then exits fluid valve 101 through second fluid outlet port 103*c* to pass (fluidly) through output line 76 (e.g., to analyte detection module 78 as depicted in FIG. 5B).

Figure 8:
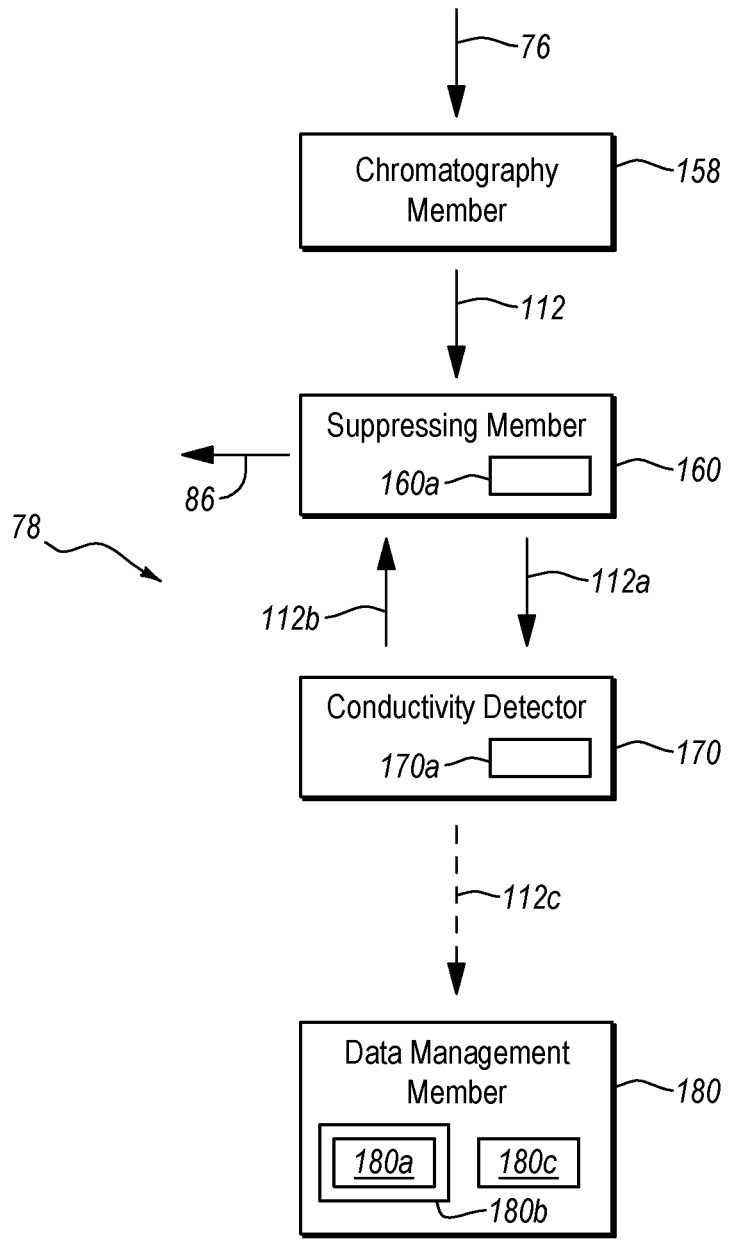
FIG. 8 illustrates an exemplary analyte detection module in accordance with another embodiment of the present disclosure.

As illustrated in FIG. 8, analyte detection module 78 can comprise a chromatography member 158, a suppressing member 160, a conductivity detector 170, and/or a data management member 180 in one or more embodiments. It will be appreciated, however, that analyte detection module 78 need not include each of the aforementioned components and/or can include additional components as known in the art. Illustratively, in operation, the eluted, concentrated analyte can pass via line 76 (or sub-line 76*a* thereof, see FIG. 2) into chromatography member 158. Chromatography member 158 can comprise, for example, an ion exchange (separation) column, such as an anion exchange or cation exchange column in certain embodiments. Such chromatography (separation) columns can be used to separate (ionic) material eluted off of the analyte concentrator (column) 90.

The eluted, concentrated (and optionally separated) analyte sample can pass via line 112 from chromatography member 158 to suppressing member 160 of analyte detection module 78 in at least one embodiment. In some embodiments, a suppressing member (i.e., "suppressor") can be used to suppress the conductivity of the eluent and increase the conductivity of the (fully) dissociated analyte (e.g., before the analyte sample is introduced into a detection component, such as conductivity detector 170). Illustratively, suppressing member 160 can be or comprise an electrolytic suppressor, eluent suppressor, electrolytic eluent suppressor, electrolytically regenerated suppressor, etc. as known in the art. Suppressing member 160 can also function and/or be used to suppress the conductivity of the eluent and increase the conductivity of the fully dissociated analyte. For instance, in some embodiments, suppressing member 160 can comprise a suppressing element 160*a* or other mechanism suitable for suppressing the conductivity of the eluent in the fluid sample and increasing the conductivity of the fully dissociated analyte in the fluid sample.

The eluted, concentrated analyte can also pass via line 112*a* from suppressing member 160 into conductivity detector 170 of analyte detection module 78 in at least one embodiment. Conductivity detector 170 can comprise a conductivity cell 170a or other mechanism suitable for measuring the conductivity of the fluid sample.

In some embodiments, conductivity detector 170 can communicate (e.g., wirelessly and/or via physical (wired) connection 112c) with data management member 180. Data management member 180 can comprise a computer-implemented software program 180a in certain embodiments. The software program and be stored on a computer-readable media 180b in one or more embodiments. Accordingly, data management member 180 can also include a (general or special purpose) computer 180c configured to operate the software program and/or execute the computer-readable media.

In addition, a fluid recycling line 112b can form an additional connection between suppressing member 160 and conductivity detector 170. Accordingly, in a recycle mode, the measured sample can be introduced back into suppressing member 160 to regenerate the suppressing member 160. The sample can then exit suppressing member 160 via line 86 as described above.

Figure 7:
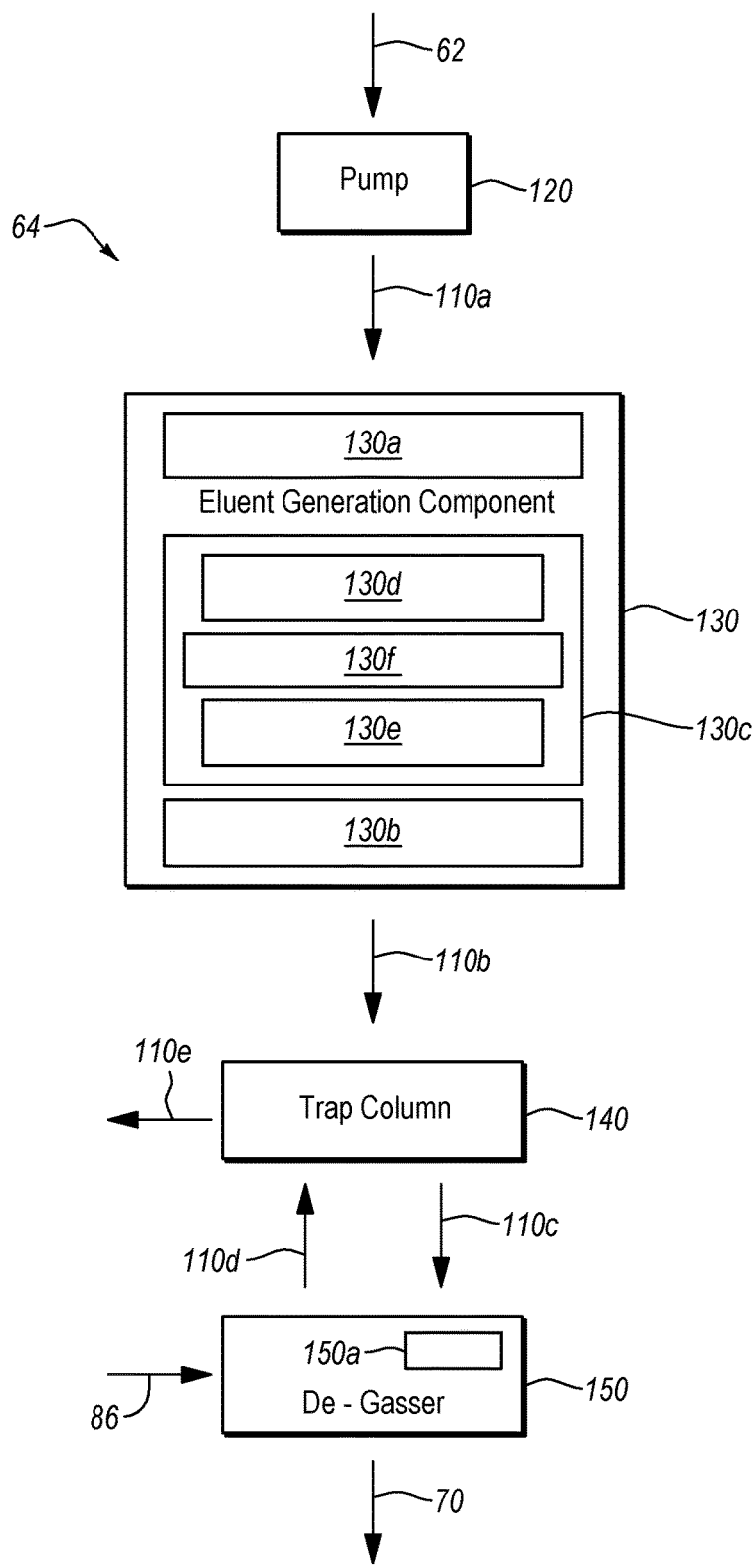
FIG. 7 illustrates an exemplary eluent generation module in accordance with another embodiment of the present disclosure.

As illustrated in FIG. 7, eluent generation module 64 can comprise a pump 120, an eluent generation component 130, a trap column 140 and/or a de-gasser 150. In operation, a substantially analyte-free effluent of and/or (discharged) from an analyte concentrator assembly and/or analyte concentrator column thereof passes via effluent line 62 and pump 120 into eluent generation component 130 by means of optional line 110a. Pump 120 can be or comprise a high-pressure, non-metallic fluid pump in one or more embodiments.

Eluent generation component 130 can include an anode 130a, a cathode 130b (disposed substantially opposite anode 130a), and an electrolytic chamber 130c disposed at least partially between anode 130a and cathode 130b. The electrolytic chamber 130c can include an electrolyte reservoir 130d, an eluent generation chamber 130e, and/or an ion exchange connector 130f (e.g., disposed between the electrolyte reservoir 130d and the eluent generation chamber 130e). The electrolyte reservoir can have at least one counter-ion disposed therein, the at least one counter-ion selected from the group consisting of potassium hydroxide, sodium hydroxide, lithium hydroxide, methane sulfonic acid, carbonic acid, carbonate, bicarbonate, and the like. In another embodiment, one of the electrodes is disposed in the electrolyte reservoir 130d and the other electrode is disposed in the eluent generation chamber 130e.

The substantially analyte-free eluent generated in eluent generation component 130 passes via optional line 110b to an optional trap column 140 (e.g., configured to trap any residual contaminants in the eluent and/or to further purify the eluent). In at least one embodiment, trap column 140 can be or comprise a continuously regenerated trap column (CR-TC) as known in the art.

The substantially analyte-free eluent then optionally passes via optional line 110c into de-gasser 150. In at least one embodiment, de-gasser 150 can comprise a gas permeable membrane 150a configured to remove at least some of any electrolytic gases in the eluent.

The substantially analyte-free eluent then passes out of eluent generation module 64 by means of (eluent) line 70 as described above. In certain embodiments, a recycling and/or regenerating fluid can enter eluent generation module 64 and/or a component thereof (e.g., de-gasser 150) by means of line 86 as described above. For instance, the recycling and/or regenerating fluid can aid in removing at least some of any electrolytic gases in the eluent as described above. The fluid can also be optionally routed to trap column 140 to regenerate the column. The fluid can also be discharged from eluent generation module 64 and/or a component thereof (e.g., trap column 140) via line 110d (e.g., into waste).

Analyte concentrator systems described herein can be operated by one or more chromatography operating platforms. Operating platforms can include one or more fluid pumps, valves, lines, and/or control software programs. For instance, CHROMELEON™ chromatography data systems is offered commercially by Thermo Fisher Scientific for controlling chromatographic processes along with other types of analytical instrumentation.

Reference is also made herein to an analyte sample (such as analyte sample 52). Such an analyte sample can comprise a fluid, such as substantially potable (drinking) water, illustratively. The sample may need to be analyzed for the presence of one or more analytes (or analyte molecules) of interest (e.g., in order to determine the level(s) of the analyte(s) therein). For instance, drinking water may need to adhere to specific (governmental) standards, such as the National Primary Drinking Water Regulations (NPDWRs or primary standards). However, the concentration of certain analytes may be difficult to detect without concentrating the analytes prior to detection.

Analyte concentrator assemblies, such as those described herein, can include an ionic or ion-exchange concentrator column configured to retain certain ionic molecules. For instance, a drinking water sample containing one or more ionic impurities can be introduced into the concentrator column such that the ions are retained in the column. By way of illustration, an anionic-exchange concentrator column can be configured to retain certain negatively-charged (anionic) molecules contained and/or disposed in the fluid sample. Accordingly, one or more anionic analytes may be retained in such a concentrator column, while the fluid sample effluent discharged therefrom can be substantially free of the one or more anionic analytes. Alternatively, the concentrator column can comprise a cationic concentrator column configured to retain certain positively-charged (cationic) molecules contained and/or disposed in the fluid sample. Accordingly, one or more cationic analytes may be retained in such a concentrator column, while the fluid sample effluent discharged therefrom can be substantially free of the one or more cationic analytes.

By way of illustration, to accomplish such an elution, the eluent (such as that generated in an eluent generation module of and/or from the substantially analyte-free effluent, as described herein) can include chemical constituents that are more likely to be retained by the concentrator column than is the analyte. Accordingly, the analyte molecules of interest are released as the chemical constituents of eluent are retained instead.

The eluent may be generated manually, by mixing an eluent solution, or automatically, by an eluent generator. The eluent generator can process an input fluid to produce an eluent therefrom. For instance, the eluent generator can process the substantially analyte-free effluent (e.g., by exchanging molecules disposed therein with molecules adapted for eluting the retained analyte(s) from the concentrator column).

Accordingly, various embodiments of the present disclosure overcome or solve one or more of the foregoing or other problems in the art, by providing a substantially analyte-free eluent, generated of and/or from the substantially analyte-free effluent of and/or (discharged) from an analyte concentrator assembly and/or analyte concentrator column thereof, and configured for eluting analyte(s) retained in the same or different analyte concentrator assembly and/or analyte concentrator column thereof. The analyte sample effluent can also be used as wash fluid (for washing un-retained fluid sample from the system) in certain embodiments.

The foregoing detailed description makes reference to specific exemplary embodiments. However, it will be appreciated that various modifications and changes can be made without departing from the scope contemplated herein and as set forth in the appended claims. More specifically, while illustrative exemplary embodiments in this disclosure have been more particularly described, the present disclosure is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description, which examples are to be construed as non-exclusive.

Moreover, any steps recited in any method or process described herein and/or recited in the claims may be executed in any order and are not necessarily limited to the order presented in the claims, unless otherwise stated (explicitly or implicitly) in the claims. Accordingly, the scope of the invention should be determined solely by the appended claims and their legal equivalents, rather than by the descriptions and examples given above.

It will also be appreciated that various features, members, elements, parts, and/or portions of certain embodiments of the present invention are compatible with and/or can be combined with, included in, and/or incorporated into other embodiments of the present invention. Thus, disclosure a certain features, members, elements, parts, and/or portions relative to a specific embodiment of the present invention should not be construed as limiting application or inclusion of said features, members, elements, parts, and/or portions to the specific embodiment. Rather, it will be appreciated that other embodiments can also include said features, members, elements, parts, and/or portions without necessarily departing from the scope of the present invention. Likewise, certain embodiments can include fewer features than those disclosed in specific examples without necessarily departing from the scope of this disclosure.

In addition, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of concentrating an analyte, comprising:
   processing a first portion of a fluid sample comprising an analyte in a first analyte concentrator assembly, the first analyte concentrator assembly including a first ion exchange element, the first analyte concentrator assembly retaining a first portion of the analyte and discharging a first effluent that is substantially free of the analyte, the discharged first effluent being fluid transferred from the first analyte concentrator assembly to an eluent generation module, the eluent generation module including an eluent generating component, the eluent generating component including an electrolyte reservoir, an eluent generation chamber, and an ion exchange connector, the electrolyte reservoir separated from the eluent generation chamber by the ion exchange connector;
   processing a second portion of the fluid sample comprising the analyte in a second analyte concentrator assembly, the second analyte concentrator assembly including a second ion exchange element, the second analyte concentrator assembly retaining a second portion of the analyte and discharging a second effluent that is substantially free of the analyte, the discharged second effluent being fluid transferred from the second analyte concentrator assembly to the eluent generation module;
   processing the transferred first effluent within the eluent generation module so as to produce a first eluent that is substantially free of the analyte from the transferred first effluent, the first eluent being fluid transferred from the eluent generation module to the second analyte concentrator assembly;
   processing the transferred second effluent within the eluent generation module so as to produce a second eluent that is substantially free of the analyte from the transferred second effluent, the second eluent being fluid transferred from the eluent generation module to the first analyte concentrator assembly;
   eluting the first portion of the analyte retained by the first analyte concentrator assembly with the second eluent so as to produce a first concentrated analyte sample, the first concentrated analyte sample being fluid transferred from the first analyte concentrator assembly to an analyte detection module;
   eluting the second portion of the analyte retained by the second analyte concentrator assembly with the first eluent so as to produce a second concentrated analyte sample, the second concentrated analyte sample being fluid transferred from the second analyte concentrator assembly to the analyte detection module;
   analyzing the first concentrated analyte sample in the analyte detection module, the analyte detection module includes at least one detector selected from the group consisting of a conductivity detector, an electrochemical detector, a mass spectrometry detector, and an ultraviolet detector; and
   analyzing the second concentrated analyte sample in the analyte detection module.

2. The method of claim 1, wherein the first analyte concentrator assembly and the second analyte concentrator assembly are each fluid coupled with a fluid valve such that:
   in a first valve configuration:
      first, the discharged first effluent is fluid transferred from the first analyte concentrator assembly, through the fluid valve, and to the eluent generation module to be processed within the eluent generation module so as to produce the first eluent from the transferred first effluent;
      second, the first eluent is transferred from the eluent generation module, through the fluid valve, and to the second analyte concentrator assembly to elute the second portion of the analyte retained by the second analyte concentrator assembly; and
      third, the second concentrated analyte sample is fluid transferred from the second analyte concentrator assembly, through the fluid valve, and to the analyte detection module and analyzed therein, and in a second valve configuration:
first, the discharged second effluent is fluid transferred from the second analyte concentrator assembly, through the fluid valve, and to the eluent generation module to be processed within the eluent generation module so as to produce the second eluent from the transferred second effluent;
second, the second eluent is transferred from the eluent generation module, through the fluid valve, and to the first analyte concentrator assembly to elute the first portion of the analyte retained by the first analyte concentrator assembly; and
third, the first concentrated analyte sample is fluid transferred from the first analyte concentrator assembly, through the fluid valve, and to the analyte detection module and analyzed therein.

3. An analyte concentrator system, comprising:
an analyte concentrator assembly, comprising:
a first fluid inlet for receiving a fluid sample comprising an analyte;
an analyte retention mechanism coupled with the first fluid inlet, the analyte retention mechanism including a first analyte concentrator column and a second analyte concentrator column, the first analyte concentrator column including a first ion exchange element adapted for binding ionic molecules, the second analyte concentrator column including a second ion exchange element adapted for binding ionic molecules, the analyte retention mechanism being configured to retain at least a portion of the analyte;
a first fluid outlet for discharging an effluent of the fluid sample, the first fluid outlet being coupled with the analyte retention mechanism;
a second fluid inlet for receiving an eluent, the analyte retention mechanism being coupled with the second fluid inlet so as to receive the eluent; and
a second fluid outlet for discharging a concentrated analyte sample, the second fluid outlet being coupled with the analyte retention mechanism; and
an eluent generation module including an eluent generating component, the eluent generating component including an electrolyte reservoir, an eluent generation chamber, and an ion exchange connector, the electrolyte reservoir separated from the eluent generation chamber by the ion exchange connector, the eluent generation module coupled with the first fluid outlet and with the second fluid inlet of the analyte concentrator assembly, the eluent generation module being configured to receive the discharged effluent and to generate the eluent from the discharged effluent, the eluent being substantially free of the analyte;
wherein the analyte comprises at least one ionic molecule; and
the first analyte concentrator column further comprises:
an encircling side wall extending from a first end of the first analyte concentrator column to an opposing second end of the first analyte concentrator column, the side wall of the first analyte concentrator column at least partially bounding a first internal cavity, the first ion exchange element being disposed within the first internal cavity;
a first opening disposed at the first end of the first analyte concentrator column and in fluid communication with the first internal cavity, the first opening being selectively fluid connectable with the first fluid inlet and with the second fluid outlet; and
a second opening disposed at the second end of the first analyte concentrator column and in fluid communication with the first internal cavity, the second opening being selectively fluid connectable with the first fluid outlet and with the second fluid inlet,
wherein the analyte concentrator assembly further comprises a fluid valve having a plurality of selectively connectable ports, the fluid valve being selectively configurable between a plurality of configurations to selectively connect at least some of the plurality of ports, the first fluid inlet comprising a first port of the plurality of ports, the first fluid outlet comprising a second port of the plurality of ports, the second fluid inlet comprising a third port of the plurality of ports, and the second fluid outlet comprising a fourth port of the plurality of ports,
wherein in a first fluid valve configuration:
the first opening is in fluid communication with the first port;
fluid communication between the first opening and the fourth port is restricted;
the second opening is in fluid communication with the second port; and
fluid communication between the second opening and the third port is restricted, and
wherein in a second fluid valve configuration:
the first opening is in fluid communication with the fourth port;
fluid communication between the first opening and the first port is restricted;
the second opening is in fluid communication with the third port; and
fluid communication between the second opening and the second port is restricted,
wherein the fluid valve further comprises:
a fifth port in fluid communication with the first opening, the fifth port being selectively fluid connectable with the first port and with the fourth port; and
a sixth port in fluid communication with the second opening, the sixth port being selectively fluid connectable with the second port and with the third port,
wherein in the first fluid valve configuration:
the fifth port is in fluid communication with the first port;
fluid communication between the fifth port and the fourth port is restricted;
the sixth port is in fluid communication with the second port; and
fluid communication between the sixth port and the third port is restricted, and
wherein in a second fluid valve configuration:
the fifth port is in fluid communication with the fourth port;
fluid communication between the fifth port and the first port is restricted;
the sixth port is in fluid communication with the third port; and
fluid communication between the sixth port and the second port is restricted,
wherein the analyte concentrator assembly further comprises:
the second analyte concentrator column further comprising:
an encircling side wall extending from a first end of the second analyte concentrator column to an opposing second end of the second analyte concentrator column, the side wall of the second analyte concentrator column at least partially bounding a second internal cavity, the second ion exchange element disposed within the second internal cavity;

a third opening disposed at the first end of the second analyte concentrator column and in fluid communication with the second internal cavity; and a fourth opening disposed at the second end of the second analyte concentrator column and in fluid communication with the second internal cavity, the fluid valve further comprising:

a seventh port in fluid communication with the third opening;

an eighth port in fluid communication with the fourth opening;

a ninth port; and a tenth port, the seventh port being selectively fluid connectable with the first port and with the ninth port, and the eighth port being selectively fluid connectable with the second port and with the third port, the tenth port being in fluid communication with the ninth port, wherein in the first fluid valve configuration:

the seventh port is in fluid communication with the ninth port;

fluid communication between the seventh port and the first port is restricted;

the eighth port is in fluid communication with the third port; and fluid communication between the eighth port and the second port is restricted, and wherein in the second fluid valve configuration:

the seventh port is in fluid communication with the first port;

fluid communication between the seventh port and the ninth port is restricted;

the eighth port is in fluid communication with the second port; and fluid communication between the eighth port and the third port is restricted.

4. The analyte concentrator system of claim 3, wherein the eluent generating component further comprises an anode and a cathode disposed substantially opposite the anode, and an electrolytic chamber disposed at least partially between the anode and the cathode.

5. The analyte concentrator system of claim 3, wherein the electrolyte reservoir has at least one counter-ion disposed therein, the at least one counter-ion selected from the group consisting of potassium hydroxide, sodium hydroxide, lithium hydroxide, methane sulfonic acid, carbonic acid, carbonate, and bicarbonate.

6. The analyte concentrator system of claim 3, wherein the eluent generation module further comprises one or more components selected from the group consisting of:

a degasser connected to the eluent generating component; and a trap column connected to the eluent generating component.

7. The analyte concentrator system of claim 3, further comprising a fluid pump connected to the eluent generating component and to the first fluid outlet of the analyte concentrator assembly, the fluid pump being configured to facilitate fluid transfer of the discharged effluent to the eluent generating component.

8. The analyte concentrator system of claim 7, wherein the fluid pump is connected to a fluid transfer line that fluidly couples the eluent generating component and the first fluid outlet of the analyte concentrator assembly, the fluid pump being connected to the fluid transfer line between the eluent generating component and the first fluid outlet so as to facilitate fluid transfer of the discharged effluent to the eluent generating component.

9. The analyte concentrator system of claim 3, further comprising an analyte detection module, the analyte detection module including at least one detector selected from the group consisting of a conductivity detector, an electrochemical detector, a mass spectrometry detector, and an ultraviolet detector.

10. The analyte concentrator system of claim 9, wherein the analyte detection module further comprises a computer.

* * * * *

UNITED STATES PATENT AND TRADEMARK OFFICE
CERTIFICATE OF CORRECTION

PATENT NO. : 11,906,409 B2
APPLICATION NO. : 17/577262
DATED : February 20, 2024
INVENTOR(S) : Kannan Srinivasan It is certified that error appears in the above-identified patent and that said Letters Patent is hereby corrected as shown below:

In the Claims

In Column 25, Claim 3, Line 19, delete "and" and insert the same at Line 21, after "third port," as a continuation subpoint.

Signed and Sealed this
Sixteenth Day of April, 2024

Katherine Kelly Vidal
*Director of the United States Patent and Trademark Office*